(12) United States Patent
Geske et al.

(10) Patent No.: US 12,040,697 B2
(45) Date of Patent: Jul. 16, 2024

(54) METHODS OF STARTING POWER CONVERTER SYSTEMS, AND POWER CONVERTER SYSTEMS

(71) Applicant: GE Energy Power Conversion Technology Limited, Warwickshire (GB)

(72) Inventors: Martin Geske, Berlin (DE); Hendrik Gloes, Berlin (DE); Thomas Brueckner, Munich (DE)

(73) Assignee: GE Energy Power Conversion Technology Limited, Warwickshire (GB)

(*) Notice: Subject to any disclaimer, the term of this patent is extended or adjusted under 35 U.S.C. 154(b) by 283 days.

(21) Appl. No.: 17/607,606

(22) PCT Filed: Apr. 29, 2020

(86) PCT No.: PCT/EP2020/061959
§ 371 (c)(1),
(2) Date: Oct. 29, 2021

(87) PCT Pub. No.: WO2020/221831
PCT Pub. Date: Nov. 5, 2020

(65) Prior Publication Data
US 2022/0231599 A1 Jul. 21, 2022

(30) Foreign Application Priority Data

Apr. 29, 2019 (EP) .................................. 19171650

(51) Int. Cl.
*H02M 1/36* (2007.01)
*H02M 1/08* (2006.01)
(Continued)

(52) U.S. Cl.
CPC ............... *H02M 1/36* (2013.01); *H02M 1/08* (2013.01); *H02M 1/32* (2013.01); *H02M 5/4585* (2013.01)

(58) Field of Classification Search
CPC .......... H02M 1/36; H02M 5/44; H02M 5/453; H02M 5/456; H02M 5/458; H02M 5/4585; H02P 27/06; H02P 27/08
See application file for complete search history.

(56) References Cited

U.S. PATENT DOCUMENTS 8,127,564 B2  3/2012  Takamatsu
8,508,258 B2  8/2013  Ishikawa
(Continued)

FOREIGN PATENT DOCUMENTS

EP    2416480 B1   1/2018
EP    3297148 A1   3/2018
(Continued)

OTHER PUBLICATIONS

International Search Report and the Written Opinion of the International Searching Authority, or the Declaration from International Appl. No. PCT/EP2020/061959, dated Jul. 8, 2020.
(Continued)

*Primary Examiner* — Alex Torres-Rivera
(74) *Attorney, Agent, or Firm* — WOOD IP LLC

(57) ABSTRACT

A power converter system is described. The system includes a power converter with a first converter including a plurality of semiconductor devices. Each semiconductor device includes at least a controllable semiconductor switch having a threshold voltage and a gate voltage for normal on-state conduction. The first converter has first and second DC
(Continued)

terminals connected to a DC circuit, and a plurality of AC terminals. A controller is configured to supply current to the first converter (e.g., from an AC power source) and enable a short circuit state of the first converter by controlling semiconductor switches of the first converter to create at least one short circuit path through the first converter that carries the supplied current. At least one of the semiconductor switches in at least one of the short circuit paths is operated with modified on-state conduction in order to increase conduction losses. A gate driver applies to the semiconductor switch a modified gate voltage that is less than the gate voltage for normal on-state conduction.

12 Claims, 15 Drawing Sheets

(51) Int. Cl.
*H02M 1/32* (2007.01)
*H02M 5/458* (2006.01)

(56) References Cited

U.S. PATENT DOCUMENTS

| | | | |
|---|---|---|---|
| 9,608,618 | B2 | 3/2017 | Sakai |
| 2010/0050676 | A1* | 3/2010 | Takamatsu ............. B60K 11/02 |
| | | | 62/259.2 |
| 2021/0351701 | A1* | 11/2021 | Södö ..................... H02M 1/32 |

FOREIGN PATENT DOCUMENTS

| | | |
|---|---|---|
| JP | 2006049567 A | 2/2006 |
| JP | 2008099359 A | 4/2008 |
| JP | 2016007120 A | 1/2016 |
| WO | 2020221831 A1 | 11/2020 |

OTHER PUBLICATIONS

European Search Report from EP Appl. No. 19171650.5, dated Oct. 21, 2019.

EP Communication pursuant to Article 94(3) EPC for EP Application No. EP19171650.5 dated Sep. 6, 2021, 9 pages.

Lutz et al. "Semiconductor Power Devices—Physics, Characteristics, Reliability," Springer Berlin Heidelberg, 2011.

\* cited by examiner

METHODS OF STARTING POWER CONVERTER SYSTEMS, AND POWER CONVERTER SYSTEMS

TECHNICAL FIELD

The present invention relates to methods of controlling power converter systems that include a power converter, and in particular to methods of controlling power converter systems on start-up. The method can be used to heat the power converter before starting the power converter system with normal switching operation.

BACKGROUND ART

A power converter may be used to convert an alternating current (AC) voltage to a direct current (DC) voltage or vice versa. The power converter may include a first converter with a plurality of AC terminals that may be connected to the stator of an electrical machine (e.g., a motor or generator), and two DC terminals. The first converter may include a plurality of controllable semiconductor switches arranged in a suitable topology that are switched (i.e., turned on and off by a gate driver) during a normal switching operation. In the case of a motor, the first converter will typically operate as an inverter (or variable speed drive) by controlling the semiconductor switches to convert a DC input voltage to an AC output voltage that meets the required voltage, frequency and current requirements of the motor. In the case of a generator, the first converter will typically operate as a rectifier by controlling the semiconductor switches to convert an AC input voltage provided by the generator into a DC output voltage.

The power converter may also include a second converter with two DC terminals connected to the DC terminals of the first converter by means of a DC link, and a plurality of AC terminals that are typically connected to an AC circuit. The second converter may also include a plurality of controllable semiconductor switches arranged in a suitable topology that are switched (i.e., turned on and off by a gate driver) during a normal switching operation. The DC link will typically include one or more capacitors. The AC circuit may be used to receive power from, or export power to, an AC power network or utility grid, for example.

In many cases, the capacitors in the DC link that connects the first and second converters will need to be pre-charged before the power converter starts normal switching operation. This can be done using a pre-charge circuit which is connected to the DC link or to the AC-side of the second converter, for example. Such a pre-charge circuit may be connected to an AC power network or a utility grid, or to a separate AC power supply. The connection to the AC power network, utility grid or separate AC power supply can be made through a separate insulation transformer (sometimes called a pre-charge transformer) or through an auxiliary winding of the main transformer which is connected to the power converter.

Each semiconductor switch may further include an anti-parallel connected diode, i.e., a diode connected in anti-parallel with its associated controllable semiconductor switch. The suitability of particular semiconductor switches and other semiconductor devices like fast recovery diodes for use in the power converter is determined by their technical specification (or datasheet).

Power converters often have to be started when the ambient temperature—and consequently the junction temperature of the semiconductor switches and diodes—is relatively low. This may require either a special design and measures to operate the semiconductors switches and diodes at low temperatures, e.g., lowering the DC link voltage, and specific gate control functions, or on the other hand measures to heat the semiconductor devices to a suitable temperature before start-up. Other converter components such as gate driver boards and controller boards, and passive components may also need to be heated.

Even state of the art IGBTs and diodes exhibit an increased failure rate when they are cold, which results in a reduced blocking capability versus time. Datasheet values are typically given for junction temperatures of 25° C. and above. At lower junction temperatures, a voltage derating can be required. The recovery behaviour of cold diodes can become critical due to snappy turn-off recovery. Snappy diode recovery can cause high transients and oscillations of current and voltage leading to electromagnetic disturbances and potential damage to the device. If possible, special measures of gate control might be required to handle the switching behaviour at cold conditions. In addition, the blocking capability of all semiconductor switches such as IGBTs, GTOs, IGCTs etc. and power diodes is impaired by failures due to cosmic radiation. For example, single event burnouts (SEBs) due to cosmic rays are known to contribute to the random failure rate. Their occurrence is strongly dependent on switch blocking voltage and on switch temperature. In particular, failure rates increase with higher blocking voltage and with lower junction temperature.

The present invention aims to ensure that the power converter starts operation after the junction temperature of the semiconductor devices and/or the power converter temperature has been increased above a minimum temperature (e.g., 5 to 25° C.). The present invention utilises the fact that power losses in semiconductor switches are dissipated in the form of heat which can be further distributed or circulated to heat up the power converter and other components. The present invention may be used when starting the power converter, for example.

The present invention aims to replace known ways of heating a power converter using separate heating devices before start-up in a low temperature environment. These known ways include:
  heating the power electronics and the converter cabinet by distributing warmed air, e.g., using fans,
  using resistive heaters positioned close to the power semiconductors or the corresponding heatsinks, or
  circulating warmed coolant through the coolant system that will subsequently be used to cool the semiconductor switches and diodes during normal operation. The coolant may be warmed by integrated heaters within the cooling system. For liquid cooled power converter systems, the internal fans are also used to distribute heat loss from heating systems to the environment. The present invention can be used with both liquid and air cooled power converter systems.

The present invention may also be used to indirectly heat other temperature-sensitive components, e.g., converter components such as gate driver boards, control boards and sensors, and passive components such as capacitors, resistors, reactors and busbars, to above a minimum temperature (e.g., 0° C., or more preferably, at least 5° C. or higher) before start-up. Such components are located inside the converter cabinet that houses the power converter or within one or more neighbouring cabinets that can also be warmed if they are thermally coupled with the converter cabinet through air exchange or through a liquid exchange with heat exchangers or heat sinks, for example. Thermal coupling to the power converter can be provided through air flow and/or coolant flow.

SUMMARY OF THE INVENTION

The present invention provides a method of controlling a power converter system (e.g., on start-up) comprising:
a power converter comprising a first converter including a plurality of semiconductor devices, each semiconductor device including at least a controllable semiconductor switch having a threshold voltage and a gate voltage for normal on-state conduction, the first converter having first and second direct current (DC) terminals connected to a DC circuit (e.g., a DC link), and a plurality of alternating current (AC) terminals;
wherein the method comprises the step of:
supplying current to the first converter and enabling a short circuit state of the first converter by controlling semiconductor switches of the first converter to create at least one short circuit path through the first converter that carries the supplied current;
wherein at least one of the semiconductor switches in at least one of the short circuit paths is operated with modified on-state conduction in order to increase conduction losses by applying to the at least one of the semiconductor switches a modified gate voltage that is less than the gate voltage for normal on-state conduction, and wherein the modified gate voltage is equal to the threshold voltage plus x volts, where x is in the range of about 100 mV to about 4 V.

Semiconductor Devices

The semiconductor switches can be insulated gate bipolar transistors (IGBTs) or metal oxide semiconductor field-effect transistors (MOSFETs), including power MOSFETs that are specifically designed for high power applications. Each semiconductor device of the first converter may further include an anti-parallel connected diode, i.e., a diode connected in anti-parallel with its associated controllable semiconductor switch. Any reference herein to "semiconductor device" may refer to the controllable semiconductor switch and/or the anti-parallel connected diode as appropriate.

Threshold Voltage

As used herein the term "threshold voltage" refers to the minimum gate voltage that is required to put the semiconductor switch in an on-state. The threshold voltage will be specified in the datasheet for the particular semiconductor switch. For example, in the case of an IGBT, the threshold voltage will be the gate-emitter threshold voltage ($V_{GE(th)}$) which might typically be in the range about 4 to about 8 V, and typically about 6 V. In the case of a MOSFET, the threshold voltage will be the gate-source threshold voltage ($V_{GS(th)}$) which might typically be in the range about 2 to about 7 V.

Normal On-State Conduction and Modified On-State Conduction

As is well known, a gate driver is connected to each semiconductor switch and is used to apply a gate voltage to control its switching operation. For example, in the case of an IGBT, the gate driver is connected to the gate and emitter connections and is used to apply a gate-emitter voltage ($V_{GE}$) to the IGBT. In the case of a MOSFET, the gate driver is connected to the gate and source connections and is used to apply a gate-source voltage ($V_{GS}$) to the MOSFET. Controlling the gate driver to apply different gate voltages can therefore switch the semiconductor switch between the on- and off-states as required during normal switching operation. The turn-on and transfer characteristics of suitable semiconductor devices such as IGBTs and MOSFETs is described in more detail below.

As used herein the terms "normal on-state conduction" and "normal on-state" refer to the on-state of the semiconductor switch where the gate driver applies the "normal" gate voltage during normal switching operation of the power converter (i.e., after start-up) where conduction and switching losses are typically kept to a minimum. The normal gate voltage will be specified in the datasheet for the particular semiconductor switch. The terms "modified on-state conduction" and "modified on-state" refer to the modified on-state conduction of the semiconductor switch where the gate driver applies the modified gate voltage as defined above, for example during start-up of the power converter to generate additional heating with increased conduction losses.

If the gate voltage for normal on-state conduction of the semiconductor switches of the first converter is 15 V, the threshold voltage is 6 V, and x is 2 V, the modified gate voltage can be 8 V, for example. During normal switching operation, each semiconductor switch can be turned on and off by controlling the gate driver to apply the "normal" gate voltage of 15 V (on-state) and a gate voltage that is below the threshold voltage (off-state), respectively. However, when a short circuit state of the first converter is enabled, for example on start-up, such that at least one short circuit path through the first converter is provided, i.e., between the DC terminals, the gate driver for at least one of the semiconductor switches in at least one of the short circuit paths is controlled to apply a modified gate voltage of 8 V. This puts the at least one semiconductor in a modified on-state where it conducts and generates more heat through increased forward conduction losses as compared with the normal on-state where the gate driver applies a normal gate voltage.

Gate Driver Control

The modified gate voltage applied by each gate driver may be subject to open-loop control where a fixed value of modified gate voltage (e.g., 8 V) is applied. The fixed value of the modified gate voltage could be selected with reference to known system parameters such as power losses etc. In another arrangement, a closed-loop control may be used where a controller (e.g., the converter controller or the gate driver itself) can set the value of the modified gate voltage with reference to one or more measured parameters including voltage measurements for the respective semiconductor switch, temperature measurements etc.

The modified gate voltage applied by each gate driver may be based on a reference value which may be fixed or variable.

In one arrangement, each gate driver may comprise one or more switch mode DC/DC converters (e.g., buck-converters). A switch mode DC/DC converter can be operated with different duty cycles so that the gate driver applies either the normal gate voltage or the modified gate voltage to the associated semiconductor switch.

The gate drivers can receive a command signal from a controller (e.g., a system controller or the converter controller) to apply either the modified gate voltage or the normal gate voltage. For example, the gate drivers can receive a first command signal on start-up to set the modified gate voltage. The gate drivers can confirm to the controller that the modified gate voltage is set. The gate drivers can subsequently receive a second command signal when the short circuit state is to be ended to set the normal gate voltage. The gate drivers can confirm to the controller that the normal gate voltage is set so that the power converter can be transitioned safely to normal switching operation.

The gate driver control on start-up can be summarised as follows:
1) set a modified gate voltage for the semiconductor switch, e.g., by using an appropriate reference value for modified on-state conduction,
2) apply the modified gate voltage to the semiconductor switch to provide heating during the short circuit state,
3) turn off the semiconductor switch,
4) set the normal gate voltage, e.g., by using an appropriate reference value for normal on-state conduction, and
5) apply the normal gate voltage to the semiconductor switch during normal switching operation.

Non-Switching Operation Using Modified On-State

In some arrangements, the at least one semiconductor switch can be maintained in the modified on-state by the gate driver for substantially the duration of the short circuit state of the first converter (step 2). In other words, the at least one semiconductor switch is not switched between the modified on-state and the off-state but remains in the modified on-state and can therefore provide an ohmic characteristic—with a resistance that is within a certain range or above a minimum resistance value—that can dissipate the supplied current as heat to warm-up the power converter. As described in more detail below, operating an IGBT in the "active region", for example, can provide current limiting due to the pinch-off effect which allows operation within a specific range of resistance when the applied DC voltage is kept substantially constant. The at least one semiconductor switch is then turned off (step 3) when the short circuit state is ended, and the first converter is subsequently transitioned towards normal operation (steps 4 and 5).

Switching Operation Using Modified On-State

In some arrangements, during the short circuit state, the at least one semiconductor switch can be switched repeatedly by the gate driver between the modified on-state and the off-state (steps 2 and 3). In other words, the gate driver can sequentially apply to the at least one semiconductor switch the modified gate voltage and a voltage that is less than the threshold voltage (e.g., 0 V) so that the at least one semiconductor switch is switched repeatedly between the modified on-state and the off-state. This can provide additional heating because of the associated switching losses that are generated as well as the forward conduction losses that result from operating the at least one semiconductor device in the modified on-state. The switching may be controlled using a duty cycle or pulse width modulation (PWM), for example. Current will flow intermittently through the short circuit path that includes the switched semiconductor switch.

Short Circuit Path

In a preferred arrangement, a particular short circuit path through the first converter will include two or more semiconductor switches connected in series—for example, defining a phase leg of the first converter.

In one arrangement, while the short circuit state is enabled, all of the semiconductor switches in a particular short circuit path may be maintained in an on-state so that current will flow continuously through the particular short circuit path (i.e., between the DC terminals of the first converter) while the short circuit state is enabled. At least one of the semiconductor switches in the particular short circuit path will be maintained in a modified on-state. The remaining semiconductor switches may be maintained in a modified on-state or a normal on-state as appropriate.

However, it is generally preferred that at least one of the semiconductor switches in a particular short circuit path is switched (either between the modified on-state and the off-state or between the normal on-state and the off-state) so that current will only flow intermittently through the particular short circuit path while the short circuit state is enabled. In one arrangement, all of the semiconductor switches in the particular short circuit path are switched. But it is generally preferred that at least one of the semiconductor switches in the particular short circuit path is maintained in the on-state (either the modified on-state or the normal on-state) by its respective gate driver and can therefore provide an ohmic characteristic—with a resistance that is within a certain range or above a minimum resistance value. Such preferred "chopper" operation of a particular short circuit path during the short circuit state (i.e., where at least one semiconductor switch in the short circuit path remains permanently in an on-state and at least one semiconductor switch is switched) allows the semiconductor switch that undergoes the switching operation to control heating losses and the DC link voltage.

If two or more short circuit paths are provided through the first converter when the short circuit state is enabled, the semiconductor switches may be operated differently in each short circuit path.

Modified Gate Voltage Selection

The modified gate voltage is equal to the threshold voltage plus x volts, where x is in the range of about 100 mV to about 4 V. Within this range, the modified gate voltage will be selected to increase forward conduction losses (as compared with the normal on-state where the gate drivers apply a normal gate voltage) in order to provide increased heating.

The selection of the modified gate voltage will also depend on the output and transfer characteristics of the semiconductor switches that are utilised in the first converter as described in more detail below for IGBTs and MOSFETs.

IGBTs

The output and transfer characteristics of an IGBT are shown in FIGS. 1A to 1C. In particular, FIGS. 1A and 1B show how the collector current $I_C$ depends on the gate-emitter voltage $V_{GE}$ and the collector-emitter voltage $V_{CE}$ for different regions of on-state condition. FIG. 1C shows a transfer characteristic which describes the maximum collector current versus the applied gate-emitter voltage $V_{GE}$.

FIG. 1A shows multiple operation regions of the IGBT. The nominal collector current $I_{Cnom}$ represents the rated current of the IGBT which is specified by the manufacturer. The normal collector current $I_{CN}$ is the operational current and represents the maximum collector current during normal converter operation which applies during normal switching operation of the IGBT. The DC link voltage of the first converter is represented by $V_{DC}$. During a normal switching operation, the IGBTs of the first converter are controlled by the gate drivers to switch between the on- and off-states to convert a DC voltage at the DC terminals to an AC voltage at the AC terminals, or vice versa. This normal switching operation is represented in FIG. 1A by the straight line extending between the DC link voltage Vic where the IGBT is in a forward blocking mode (off-state) and a particular collector-emitter saturation voltage $V_{CE(sat)1}$ where the IGBT is in a conduction mode (normal on-state) and is operated in the "saturation region" as explained in more detail below. The gate-emitter voltage that is applied by the gate driver during normal switching operation to put the IGBT in the normal on-state is typically about 15 V, but can be more generally in the range of about 14 to about 20 V, for example. In the present invention, a much lower gate-emitter voltage is applied by the gate driver to put the IGBT in the modified on-state. In FIG. 1A, the region that represents the modified gate-emitter voltage V'$_{GE}$ is indicated by a shaded area that is mainly located within the "active region" and which also extends into a "quasi-saturation region" that is close to a pinch-off limit. This shaded area is also shown in FIG. 1B. If the IGBT is operated with a specific modified gate-emitter voltage (in FIG. 1B it is labelled V$_{GE2}$) that is much lower than the normal gate-emitter voltage V$_{GE1}$, it can be seen that the conduction losses are increased since the operational current I$_{CN}$ is multiplied by collector-emitter saturation voltage V$_{CE(sat)2}$ or a collector-emitter voltage V$_{CE}$ within the "active region" of the IGBT. The modified gate-emitter voltage V$_{GE2}$ therefore generates a much higher conduction loss than if the operational current I$_{CN}$ is multiplied by the collector-emitter saturation voltage V$_{CE(sat)1}$ that represents normal on-state conduction. It will be readily understood that the operational current can be lower than what is indicated due to alternating output or input current waveforms. In practice, the operational current varies during switching operation between I$_{CN}$ and zero.

The various operation regions of the IGBT are now explained in more detail with reference to FIG. 1A.

If the gate-emitter voltage applied by the gate driver is less than the gate-emitter threshold voltage (i.e., V$_{GE}$<V$_{GE(th)}$) the IGBT is operated in the "cut-off region" where I$_C$=0 and the IGBT is in a forward blocking mode. In the cut-off region, the IGBT behaves like an open switch and is considered to be in the off-state (or turned off).

If the gate-emitter voltage applied by the gate driver is greater than the gate-emitter threshold voltage (i.e., V$_{GE}$>V$_{GE(th)}$) and the collector-emitter voltage is less than or equal to the collector-emitter saturation voltage (i.e., V$_{CE}$<V$_{CE(sat)}$) the IGBT is operated in the "saturation region". In the "saturation region", the IGBT behaves like a closed switch and is considered to be in the on-state (or turned on).

If the gate-emitter voltage applied by the gate driver is greater than the gate-emitter threshold voltage (i.e., V$_{GE}$>V$_{GE(th)}$) and the difference between the applied gate-emitter voltage and the gate-emitter threshold voltage is less than the collector-emitter voltage (i.e., V$_{CE}$>(V$_{GE}$-V$_{GE(th)}$)), the channel below the gate of the IGBT pinches off and the IGBT is operated in the "active region" and is limited to a maximum current. This "pinch off" limit is V$_{CE}$=V$_{GE}$-V$_{GE(th)}$ and is represented in FIGS. 1A and 1B by the dotted curved line. The maximum currents for different gate-emitter voltages within the "active region" are also shown in FIG. 1A. The maximum current depends on the transfer characteristic and the related transconductance which depends, in turn, on the applied gate-emitter voltage. Further technical information on the "pinch-off" effect, transfer and output characteristics for IGBTs can be found in standard texts such as "Semiconductor Power Devices—Physics, Characteristics, Reliability" J Lutz et al., Springer Berlin Heidelberg, 2011, for example. A typical IGBT design can support around or more than five times its rated current in the "active region" during a short circuit condition for about 10 μs with a normal gate-emitter voltage close to 15 V.

For the present invention, the modified gate-emitter voltage is lower than the normal gate-emitter voltage which limits the maximum collector current at a lower level because the "pinch-off" limit is lower. Put another way, the collector current is limited through the pinch-off effect in the "active region" which is represented by the maximum current for the applied gate-emitter voltage. The transfer characteristic shown in FIG. 1C describes this relationship where the transconductance g$_{fs}$ is the gradient of the gate-emitter voltage versus the collector current (i.e., g$_{fs}$=ΔI$_C$/ΔV$_{GE}$) which is influenced slightly by the junction temperature of the IGBT. As a result, the temperature dependence slightly influences the threshold voltage as well. This transfer characteristic is used to define the indicated operation regions of FIGS. 1A and 1B. The maximum collector current I$_{C1max}$ represents the short-circuit current (or I$_{SC}$) which would apply if a hard switching fault occurs during normal switching operation. The normal gate-emitter voltage is V$_{GE1}$. The modified gate-emitter voltage is V$_{GE2}$ and has a corresponding maximum collector current I$_{C2max}$.

For normal switching operation of the IGBT, the "saturation region" is considered to mean that the limiting current is in the range from about 5 to about 10 times the rated current and is represented by the lowest on-state voltage (saturation voltage) with respect to the collector current I$_C$. The hard saturation limit is represented in FIG. 1A by the dotted straight line. The range for the modified gate-emitter voltage shown in FIGS. 1A and 1B is further defined by the maximum collector current. For example, in FIGS. 1B and 1C where the modified gate-emitter voltage is represented by V$_{GE2}$, the current is limited to the maximum collector current I$_{C2max}$, which is equal to, or less than, the rated current of the IGBT (I$_{C2max}$≤I$_{Cnom}$). It is understood that the IGBT can be operated in the "active region" if the maximum collector current corresponds to the rated current, but that the maximum collector current can also be set to be lower than the rated current. Operation within the "quasi-saturation region" applies if the maximum collector current I$_{C2max}$ is slightly higher than the supplied current during the short circuit state. It is further understood that the "quasi-saturation region" is limited to the collector current being more than half of the maximum collector current for the same gate-emitter voltage—see I$_{C2max}$ and I$_{CN}$ in FIG. 1B.

With reference to FIG. 1C, the modified gate-emitter voltage lowers the maximum current for the "active region" (i.e., from I$_{C1max}$ to I$_{C2max}$) whereas the current flowing through an IGBT in the short circuit path with the above-mentioned "chopper" operation is controlled or operated so that the gate-emitter voltage ensures a maximum collector current I$_{C2max}$ which is equal to, or less than, the rated current of the IGBT.

The upper limit of the "quasi-saturation region" is the "pinch-off" limit.

In some arrangements, where the modified gate-emitter voltage is applied and maintained during the short circuit state without switching the IGBT, it is possible to operate very close to the "pinch-off" limit but actually within the "quasi-saturation region" (i.e., where V$_{CE}$>(V$_{GE}$-V$_{GE(th)}$)).

In forward conduction mode, an IGBT generates an on-state voltage (or voltage drop). The product of the on-state voltage and the collector current I$_C$ represents the power loss and is normally called the conduction loss which transforms to dissipated heat energy over time. Switching actions additionally produce turn-on and turn-off losses of the IGBT and recovery loss of the associated anti-parallel diode. The value of the switching frequency defines the generated heat loss through switching.

In some arrangements, where the modified gate-emitter voltage is applied for switching the IGBT during the short circuit state (i.e., where the IGBT can be switched by the gate driver between the modified on-state and the off-state), this can be carried out within the "active region" or the "quasi-saturation region". The IGBT that undergoes a switching operation may be connected in series with a second IGBT which is not switched but is maintained in the modified on-state or normal on-state during the short circuit state. In this arrangement, the second IGBT limits the current and the heat dissipation is controlled by switching the first IGBT, e.g., using an appropriate duty cycle or PWM strategy. The first IGBT can also contribute to heating through switching losses and on-state conduction losses when operated in the "active region" or the "quasi-saturation region" by appropriate selection of the modified gate-emitter voltage. Such an arrangement can control heat generation at higher DC voltages to avoid damage or destruction of the IGBTs. A higher DC voltage will generate more heat if operated at maximum current in the "active region" or "quasi-saturation region". Proper control of the first IGBT (e.g., through the duty cycle or PWM strategy) limits excess heat within the first converter.

In the "active region" or the "quasi-saturation region", the IGBT is still considered to be in the on-state (or turned on) but the "active region" (or "quasi-saturation region") is not used during the normal switching operation of the power converter, typically because the conduction losses are too high. During normal switching, the IGBT transits the "active region" and the "quasi-saturation region" during turn-on and turn-off within a very short time. However, the "active region" or "quasi-saturation region" is deliberately utilised by the present invention when the short circuit state is enabled for the first converter. The IGBT can be operated with modified on-state conduction if the gate driver applies a modified gate-emitter voltage $V'_{GE}$ that is less than the gate-emitter voltage for normal on-state conduction in the "saturation region" and is equal to $V_{GE(th)}+x$, where x is in the range of about 100 mV to about 4 V. As described above, FIG. 1A shows a shaded area that represents suitable modified gate-emitter voltages within the "active region" or "quasi-saturation region". The shaded area might be defined in part by collector-emitter voltages that are less than about 700 V (i.e., $V_{CE}<700$ V). A minimum collector-emitter voltage for the shaded area may be about 50 V and the modified on-state conduction is preferably carried out for collector-emitter voltages in the range of about 100 to about 200 V because this can simplify the control. The collector-emitter voltage will be determined by the voltage in the DC circuit (i.e., the DC link voltage) and this can be controlled when the first converter is in the short circuit state. In particular, the DC link voltage used when the first converter is in the short circuit state can be less than the DC link voltage used during normal switching operation. Using the "active region" or "quasi-saturation region" of the switched IGBT can generate more heat through forward conduction losses as compared with the heat generated during normal on-state conduction when the IGBT is operated in the "saturation region". When the first converter is operated in a short circuit state with "chopper" operation, the heat dissipation is controlled through the duty cycle or PWM strategy of at least one IGBT in the short circuit path. When the first converter is operated in a short circuit state without switching, i.e., where current flows continuously through the short circuit path, it may be advantageous to limit the heat dissipation of the at least one IGBT in the short circuit path in order to prevent damage or destruction of the IGBT. This can be done by appropriate control of the DC voltage driving the current through the IGBT, e.g., by actively controlling a power converter forming part of an auxiliary or pre-charge circuit—see below—an associated dynamic braking chopper, one or more phase legs of the first converter that are not part of a short circuit path, or passively through a limiting impedance. Such a limiting impedance can be implemented in the auxiliary or pre-charge circuit and can also be used to limit current inflows during a pre-charge step.

MOSFETs

The output characteristics of a MOSFET are shown in FIG. 2. In particular, FIG. 2 shows how the drain current ($I_D$) depends on the gate-source voltage and the drain-source voltage ($V_{DS}$) for different regions of on-state condition.

If the gate-source voltage applied by the gate driver is less than the gate-source threshold voltage (i.e., $V_{GS}<V_{GS(th)}$) the MOSFET is operated in the "cut-off region" where $I_D=0$. In the cut-off region, the MOSFET behaves like an open switch and is considered to be in the off-state (or turned off). If the gate-source voltage applied by the gate driver is greater than the gate-source threshold voltage (i.e., $V_{GS}>V_{GS(th)}$) and the drain-source voltage is greater than or equal to the drain-source saturation voltage (i.e., $V_{DS}>V_{DS(sat)}$) the MOSFET is operated in the "saturation region" which is broadly equivalent to the "active region" of the IGBT turn-on characteristic described above. In the "saturation region", the MOSFET behaves like a closed switch and is considered to be in the on-state (or turned on). During normal switching operation of the power converter, the MOSFETs of the first converter are controlled by the gate driver to switch between the on- and off-states (i.e., between the saturation and cut-off regions) to convert a DC voltage at the DC terminals to an AC voltage at the AC terminals, or vice versa. This normal switching operation is represented in FIG. 2 by the straight line extending between a particular DC voltage ($V_{DC}$) when $I_C=0$ and the MOSFET is in the off-state, and a particular current $I_{CN}$ (i.e., $I_C=I_{CN}$) when the MOSFET is in the on-state. The gate-source voltage that is applied to the MOSFET by the gate drivers during normal switching operation is defined herein as the "gate voltage for normal on-state conduction" and is typically about 15 V, but can be more generally in the range of about 14 to about 20 V, for example.

The MOSFET can be operated in the "saturation region" for modified on-state conduction if the gate driver applies a modified gate-source voltage ($V'_{GS}$) that is less than the gate-source voltage for normal on-state conduction and is equal to $V_{GE(th)}+x$, where x is in the range of about 100 mV to about 4 V. FIG. 2 includes a shaded area that represents suitable modified drain-source voltages mainly within the "saturation region" but which also extends into a "quasi-ohmic region" that is close to a pinch-off limit—represented in FIG. 2 by the dotted curved line. The "pinch-off" effect that is described above for IGBTs is also applicable to MOSFETs and is not repeated here. The shaded area might apply to drain-source voltages ($V_{DS}$) that are less than about 700 V (i.e., $V_{DS}<700$ V). This can generate more heat through forward conduction losses as compared with the heat generated during normal on-state conduction of the MOSFET. A minimum drain-source voltage for the shaded area may be about 10 V and the modified on-state conduction is preferably carried out for drain-source voltages in the range of about 100 to about 200 V because this can simplify the control. The drain-source voltage will be determined by the voltage in the DC circuit (i.e., the DC link voltage) and this can be controlled when the first converter is in the short circuit state. In particular, the DC link voltage used when the first converter is in the short circuit state can be less than the DC link voltage used during normal switching operation.

Heat Generation—Forward Conduction and Switching Losses

Controlling the first converter to carry current through the semiconductor switches in the one or more short circuit paths will generate heat as a result of the forward conduction losses and additional switching losses if applicable. The heat generated will be greater than if the semiconductor switches in the first converter are operated with normal on-state conduction because of the higher resistances with modified on-state conduction in the "active region" or "quasi-saturation region" for IGBTs, or the "saturation region" or "quasi-ohmic region" for MOSFETs. If the semiconductor devices include an anti-parallel diode, it will be understood that the diodes will not normally conduct the current during the short circuit state so will not be directly heated as a result of conduction losses. But the diodes may be indirectly heated by the thermal coupling with the associated controllable semiconductor switch, for example through a common substrate, baseplate or heat sink, particularly if the switch and diode are integrated in the same package. So it will be understood that the short circuit state may be used to provide both direct and indirect heating to the semiconductor devices of the first converter and any other components including converter components such as gate driver boards, control boards and sensors, and passive components such as capacitors, resistors, reactors and busbars etc.

Converter Design

The first converter may include a plurality of phase legs with each phase leg being connected in parallel between positive and negative DC rails of the first converter and to a respective AC terminal. The first converter may provide a multi-phase AC output voltage or receive a multi-phase AC input voltage. The positive and negative DC rails of the first converter may be connected to or define the DC terminals of the first converter. Each phase leg will include a plurality of semiconductor switches and optional diodes arranged according to the particular converter topology. At least some of the semiconductor switches in each phase leg will be connected in series between the DC terminals of the first converter, i.e., between the positive and negative DC rails, or between one of the positive and negative DC rails and any intermediate DC rail or point—a single short circuit path between the positive and negative DC rails may be provided by certain semiconductor switches of two or more of the phase legs via the intermediate DC rail or point. To put the first converter into the short circuit state, the appropriate semiconductor switches of at least one phase leg are controlled to turn on by their respective gate driver so that the supplied current may flow directly between the positive and negative DC rails. In some arrangements, just a single short circuit path is provided through the first converter, e.g., through just one phase leg. But for optimum heat generation it is generally preferred that multiple parallel short circuit paths are provided through the first converter at the same time, e.g., through two or more phase legs, and most preferably through all of them.

Short Circuit State

The method may further comprise the step of maintaining the short circuit state of the first converter for a certain period of time, or at least until a temperature that is associated with the power converter exceeds a temperature threshold. The period of time may be selected so that the temperature is increased but a maximum temperature threshold is not exceeded, for example. The maximum temperature threshold may be selected to prevent the semiconductor devices from being damaged, for example. This may provide some benefit in terms of pre-heating the semiconductor devices, the interior of the converter cabinet, or other temperature-sensitive components, for example, without the need for temperature measurements.

In general terms, the short circuit state of the first converter may be maintained until a threshold is exceeded or a particular criterion is met, which threshold or criterion could be a time threshold (e.g., a period of time) or a temperature threshold, for example.

The temperature that is associated with the power converter may be a measured temperature such as the ambient temperature, a temperature within the converter cabinet, a temperature of a liquid coolant of a cooling system (e.g., inlet or outlet temperature) for the power converter, or a temperature associated with at least one of the semiconductor devices of the power converter. The temperature that is compared against the temperature threshold may be measured, either directly or indirectly, estimated or otherwise determined in any suitable way. For example, the temperature may be measured directly using a suitable sensor such as a thermistor, thermocouple etc. that might be capable of measuring an environmental temperature, a coolant temperature, or an internal temperature of a semiconductor device, or a baseplate or heatsink, for example. A measured temperature may be used to estimate or otherwise derive a temperature that cannot itself be measured directly, e.g., the junction temperature of a semiconductor device, which is then compared against the temperature threshold. The temperature may be estimated accurately or determined using a suitable thermal model with one or more input parameters, which might include a measured temperature such as the ambient temperature or the temperature within the converter cabinet, or one or more electrical parameters of the first converter or the power converter system, for example. The temperature may be determined using one or more measured parameters such as the relatively stable current and the on-state voltage or voltage drop of one or more of the semiconductor switches with reference to a look-up table or model, for example. The temperature may also be estimated accurately by determining a temperature increase relative to an initial measured temperature, e.g., by integrating conducted current over time.

The temperature threshold may be set at a level that will meet the desired heating objectives. For example, the temperature threshold may be set at a level that will allow at least one semiconductor device of the first converter to be heated to a temperature that ensures normal voltage blocking capability in terms of failure rate due to temperature or switching behaviour and/or that will allow other components to be heated to a specified temperature. The temperature threshold may be in the range of about 0° C. to about 25° C., and more preferably about 5° C. to about 25° C., in order to provide a minimum operating temperature for the semiconductor devices and/or other components without the need for external heating.

Preferably, a significant proportion of the semiconductor devices of the first converter, and most preferably all of them, will be heated for a certain period of time or to the temperature threshold, before the short circuit state is disabled.

Heating

Heat dissipated by the semiconductor devices of the first converter can also be used to heat:
  any semiconductor devices of the first converter that do not conduct the current supplied to the DC circuit, e.g., which are not in a short circuit path or are the anti-parallel connected diodes,
  any related electronic components,
  the coolant for a cooling system that can then be used to circulate the heat generated by the semiconductor devices of the first converter, and
  the interior of the converter cabinet in which the first converter is located. This can benefit other components that may also be located within the same converter cabinet or in neighbouring cabinets that are thermally coupled to the converter cabinet, for example.

Conventional resistive heaters (or other ways of heating the power converter or the converter cubicle) can be omitted, leading to cost savings. Providing heating on start-up significantly increases power converter reliability due to reduced failure rates of semiconductor devices and other power electronics components.

As briefly mentioned above, the semiconductor devices of the first converter will normally be cooled by a cooling system during normal switching operation. In particular, the heat generated as a result of conduction and switching losses during normal switching operation of the first converter must be removed in order to prevent the semiconductor devices from overheating. At least when the semiconductor devices are being deliberately pre-heated on power converter start-up, the cooling system may be suitably controlled or even temporarily disabled so as not to hinder that process. In some cases, the cooling system may be suitably controlled to deliberately influence the pre-heating of the semiconductor devices, for example to ensure that the semiconductor devices are heated according to a particular heating profile. In other cases, the pre-heating of the semiconductor devices can be used to heat the coolant of the cooling system, which can then be circulated to other converters, components in the converter cabinet or adjacent cabinets. In other words, the cooling system can be used to distribute the heat generated by the semiconductor switches during the short circuit state.

Method Steps

The first converter may initially be in an off state. Any reference herein to the "off state" of the first converter may refer to a state in which the first converter has not yet been enabled, but typically will refer to a state where the first converter is enabled but where all of the semiconductor switches are turned off. In the "off state", a converter may operate as a passive rectifier by utilising the anti-parallel connected diodes.

The method may be started in response to a start-up command.

Second Converter

The power converter may further comprise a second converter including a plurality of semiconductor devices, each semiconductor device including at least a controllable semiconductor switch, the second converter having first and second DC terminals connected to the DC circuit (typically being a DC link with one or more capacitors), and at least one AC terminal. Any reference herein to "power converter" may refer to the first converter and/or the second converter as appropriate.

During normal switching operation of the power converter, the second converter may be operated to convert an AC voltage at its AC terminal(s) to a DC voltage at its DC terminals, or vice versa.

The current that is supplied to the first converter may be provided by an AC power source.

In one arrangement, the AC terminals of the first converter may be connected to a first AC circuit. The first AC circuit may have any suitable number of phases, but three phases would be typical with the first converter having three phase legs, three AC terminals etc. The AC terminal(s) of the second converter may be connected to a second AC circuit. The second AC circuit may have any suitable number of phases, but three phases would be typical with the second converter having three phase legs, three AC terminals etc.

The AC power source may be connected to the second AC circuit such that current is supplied to the AC terminal(s) of the second converter. The second converter is operated as a rectifier (either as a passive rectifier using the anti-parallel diodes or as an active rectifier with appropriate switching of the semiconductor switches) to supply the current to the DC terminals of the first converter through the DC circuit. If the second converter is operated as an active rectifier, it can control the voltage in the DC circuit (i.e., the DC link voltage).

One of the first and second AC circuits may be used to connect the power converter to an AC power network or utility grid, for example. For convenience, this AC circuit is referred to herein as the "main AC circuit". It will be understood that the main AC circuit may be connected to the AC terminal(s) of either the first converter or the second converter. The main AC circuit may include a main AC switch and a main transformer, as well as line filters etc. The power converter may be connected to the main AC switch and the main AC switch may be connected, in turn, to a primary winding of the main transformer, with a secondary winding of the main transformer being connectable to the AC power network or utility grid. The other of the first and second AC circuits may be connected to an electric machine (e.g., a motor or generator) or to an AC power network or utility grid, for example.

AC Power Source

The AC power source may be an auxiliary AC supply that may be connected to the first AC circuit or the second AC circuit by an auxiliary AC circuit. The AC power source may be an auxiliary winding of the main transformer of the main AC circuit that connects the power converter to the AC power network or utility grid. The auxiliary winding may be connected to the first AC circuit or the second AC circuit by an auxiliary AC circuit. The auxiliary AC circuit may include an auxiliary transformer and/or an auxiliary AC switch. If the auxiliary AC circuit is connected to the main AC circuit, it is preferably connected on the converter-side of the main AC switch so that it can supply current to the main AC circuit (and hence to the AC terminal(s) of either the first or second converter) when the main AC switch is open such that the power converter is disconnected from the AC power network or utility grid or from the primary winding of the main transformer.

If the auxiliary AC circuit includes a power converter, e.g., a rectifier, it can be connected directly to the DC circuit so that current from the auxiliary AC supply or the auxiliary winding of the main transformer can be supplied to the DC terminals of the first converter. In this case, the second converter is not needed when the first converter is operated in the short circuit state and can remain in the off state.

The auxiliary AC circuit may be a pre-charge circuit that may also be used to charge the DC link prior to normal switching operation of the power converter. As such, the auxiliary AC circuit may be rated with a much lower power rating than the power converter and is only able to provide a relatively small current and power to the first converter during the start-up method. This relatively small current rating can be used for heat generation by operating the semiconductor devices with modified on-state conduction in the "active region" or "quasi-saturation region" of the IGBTs, or the "saturation region" or "quasi-ohmic region" of the MOSFETs. The auxiliary AC circuit can also be used to supply power to controllers, cooling fans etc. that are associated with the power converter.

The AC power source may be an electric machine, e.g., a generator. The rotor of the electric machine may be mechanically connected to a turbine assembly that includes a plurality of blades that can be rotated by the wind or by water flow in the case of hydro power generation, or to the drive shaft of a prime mover, for example. The stator of the electric machine may be connected to the AC terminal(s) of the second converter by the second AC circuit. In this arrangement, the first converter will be the grid-side converter and the second converter will be the machine-side converter. The first AC circuit will be the main AC circuit that connects the power converter to the AC power network or utility grid. With the main AC switch open on start-up, current can be provided to the AC terminal(s) of the second converter by the electric machine, e.g., by controlled rotation of the turbine assembly or other prime mover. The second converter is operated as a rectifier to supply the current to the DC terminals of the first converter through the DC circuit. If the main AC switch is open, the first converter is disconnected from the AC power network or utility grid.

Power Converter System

The present invention further provides a power converter system comprising:

a power converter comprising a first converter including a plurality of semiconductor devices, each semiconductor device including at least a controllable semiconductor switch having a threshold voltage and a gate voltage for normal on-state conduction, the first converter having first and second DC terminals connected to a DC circuit (e.g., a DC link), and a plurality of AC terminals; and a controller;

wherein the controller is configured to:

supply current to the first converter and enabling a short circuit state of the first converter by controlling semiconductor switches of the first converter to create at least one short circuit path through the first converter that carries the supplied current;

wherein at least one of the semiconductor switches in at least one of the short circuit paths is operated with modified on-state conduction in order to increase conduction losses by applying to the at least one of the semiconductor switches a modified gate voltage that is less than the gate voltage for normal on-state conduction, and wherein the modified gate voltage is equal to the threshold voltage plus x volts, where x is in the range of about 100 mV to about 4 V.

The controller may be configured to maintain the short circuit state of the first converter for a period of time, or at least until a temperature exceeds a temperature threshold.

The DC circuit may be a DC link that includes one or more capacitors.

The controller may be further configured to carry out the method steps described herein.

Unless otherwise stated, any reference herein to components being "connected" includes both a direct and an indirect electrical connection or coupling, e.g., with the option for components to be electrically connected or coupled together by means of one or more interposing components.

DETAILED DESCRIPTION

Figure 1A:
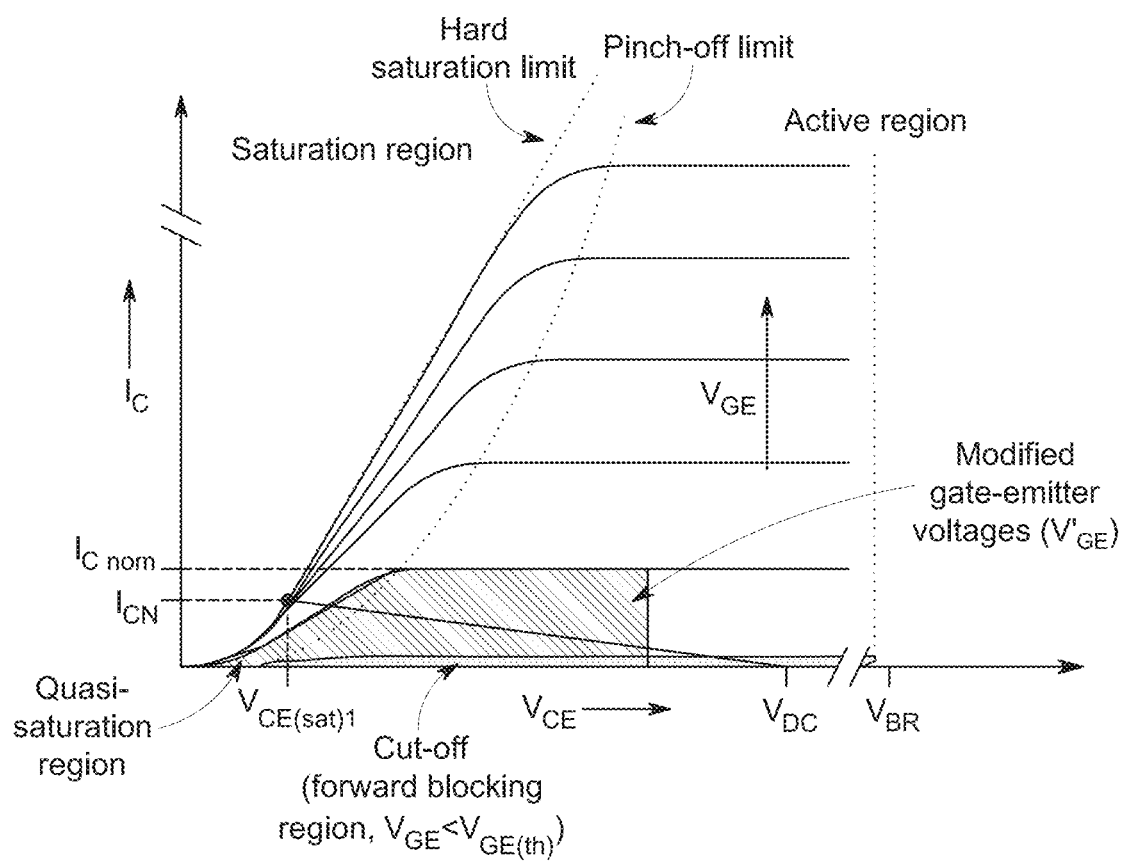
FIGS. 1A to 1C show the output and transfer characteristics of an IGBT.
Figure 1B:
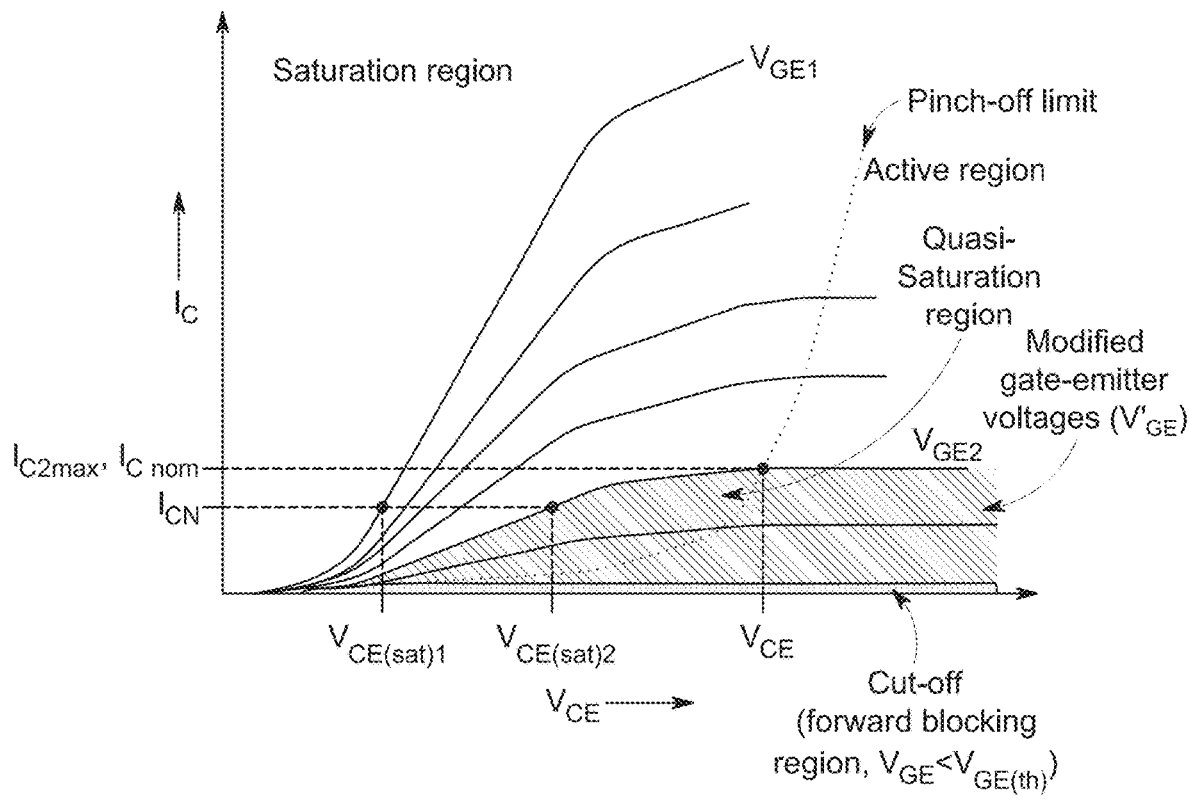
Figure 1C:
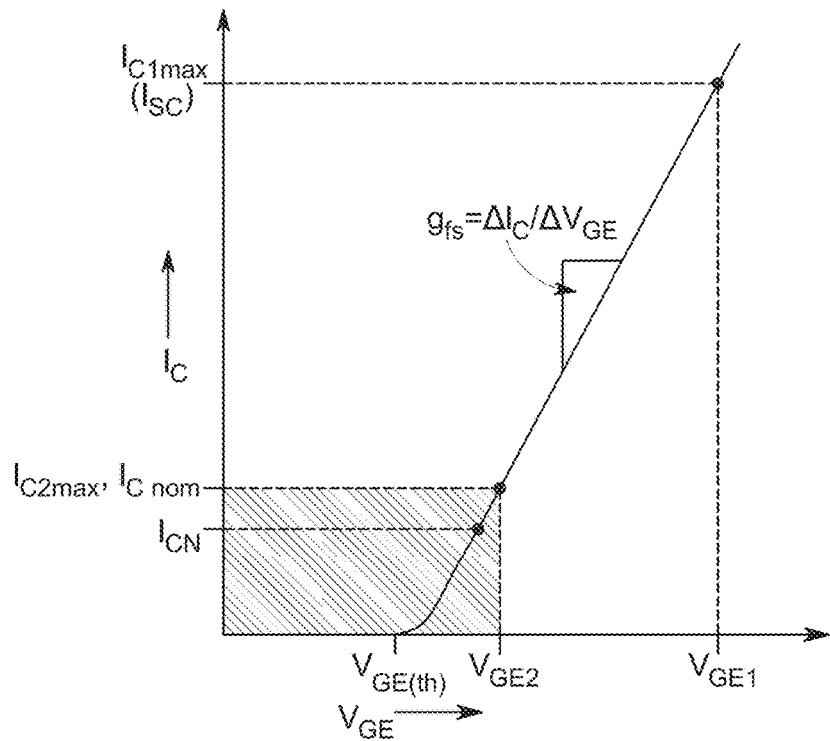
Figure 2:
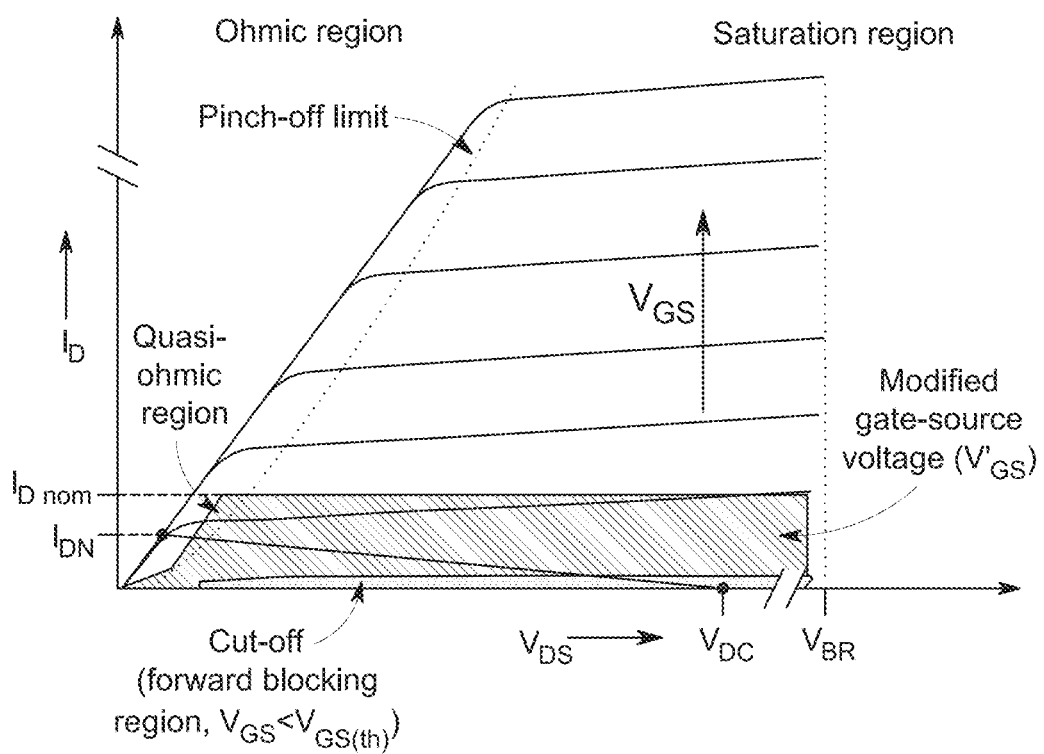
FIG. 2 shows the output characteristics of a MOSFET.
Figure 3:
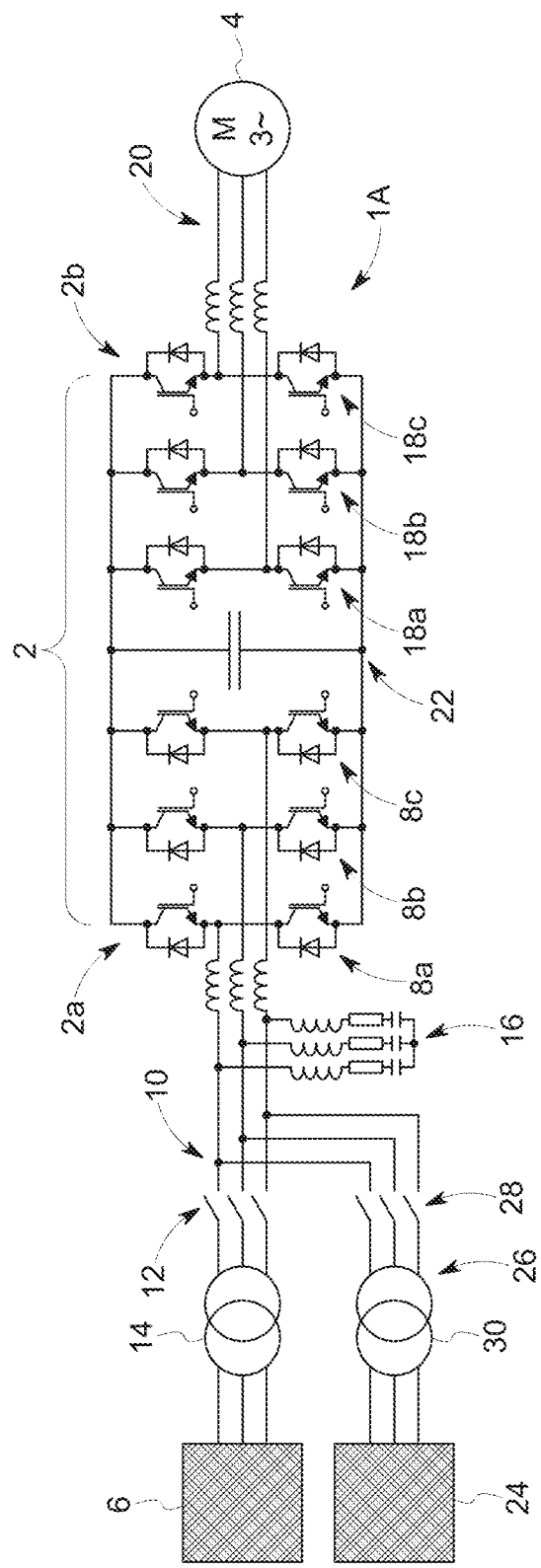
FIG. 3 is a schematic diagram of a first power converter system according to the present invention.

A first power converter system 1A is shown in FIG. 3.

The first power converter system 1A includes a power converter 2 that is used to connect an electric machine 4 (e.g., a motor) to a three-phase AC power network or utility grid 6. The power converter 2 includes a grid-side converter 2a that includes a plurality of IGBTs, and anti-parallel connected diodes, which are arranged in a two-level VSC topology with three phase legs 8a, 8b and 8c. It will be understood that different circuit topologies can also be used. The grid-side converter 2a has three AC terminals that are connected to a three-phase main AC circuit 10. The main AC circuit 10 includes a main AC switch 12, a main transformer 14 and line filters 16. The main transformer 14 is connected to the AC power network or utility grid 6.

The power converter 2 also includes a machine-side converter 2b that includes a plurality of IGBTs, and anti-parallel connected diodes, which are arranged in a two-level VSC topology with three phase legs 18a, 18b and 18c and described further below. The machine-side converter 2b has three AC terminals that are connected to the electric machine 4 by a three-phase AC circuit 20.

The DC terminals of the grid- and machine-side converters 2a, 2b are connected together by a DC link 22.

During normal operation, the main AC switch 12 is closed and the power converter 2 can be used to supply power from the AC power network or utility grid 6 to the electric machine 4, e.g., as a variable speed drive. The grid-side converter 2a will operate as an active rectifier by controlling the IGBTs with a normal switching operation to convert an AC input voltage to a DC output voltage. The grid-side converter 2s can also be operated as a passive rectifier (or diode front end). The machine-side converter 2b will operate as an inverter by controlling the IGBTs to convert a DC input voltage (i.e., from the grid-side converter 2a) to an AC output voltage that meets the required voltage, frequency and current requirements of the electric machine 4.

An auxiliary AC supply 24 is connected to the main AC circuit 10 (and in particular, to a junction between the main AC switch 12 and the line filters 16) by a three-phase auxiliary AC circuit 26. The auxiliary AC circuit 26 includes an auxiliary AC switch 28 and an auxiliary transformer 30. During normal operation, the auxiliary AC switch 28 is open.

Figure 4:
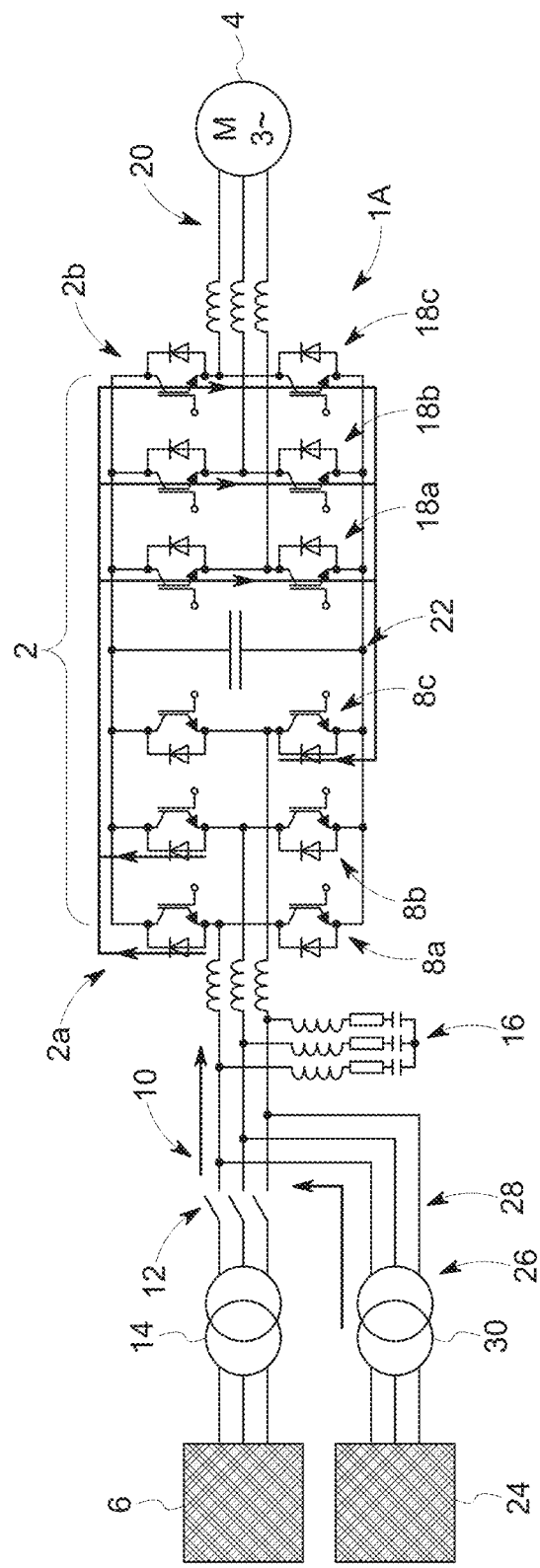
FIG. 4 is a schematic diagram of the first power converter system of FIG. 3 with the short circuit state enabled.

With reference to FIG. 4, on start-up of the power converter 2, the main AC switch 12 is open so that the power converter 2 is disconnected from the AC power network or utility grid 6. The auxiliary AC switch 28 is closed and a controller (not shown) is used to control the auxiliary AC supply 24 to supply current to the AC terminals of the grid-side converter 2a.

The grid-side converter 2a operates as a rectifier—in this case as a passive rectifier, for example—to convert the AC current from the auxiliary AC supply to DC current which is then supplied to the DC terminals of the machine-side converter 2b through the DC link 22. If the grid-side converter 2a is operated as a passive rectifier, the DC link voltage is controlled by the auxiliary AC supply. Additional control of the DC link voltage can be achieved if the grid-side converter 2a is operated as an active rectifier by controlling the switching of the IGBTs in the phase legs 8a, 8b and 8c. The DC link voltage used on start-up will often be lower than the DC link voltage during normal switching operation of the power converter 2 because this can simplify gate drive control for modified on-state conduction during the short circuit state.

The machine-side converter 2b is transitioned to a short circuit state by controlling the IGBTs to create at least one short circuit path. In FIG. 4, all of the IGBTs in the three phase legs 18a, 18b and 18c are controlled for modified on-state conduction such that three parallel short circuit paths are provided through the machine-side converter 2b. The modified on-state conduction is controlled by the gate drivers (not shown) applying a modified gate-emitter voltage as described above.

Each phase leg 18a, 18b and 18c is connected between a positive DC rail and a negative DC rail of the power converter 2 and includes two series-connected IGBTs. Although the machine-side converter 2b is shown to have a two-level VSC topology with three phase legs, it will be readily understood that other topologies can be used, e.g., three-level NPP VSC topology. When the machine-side converter 2b is transitioned to the short circuit state, the gate drivers are controlled to supply a modified gate-emitter voltage to their respective IGBT to put the IGBT into the modified on-state where it conducts in the "active region" (or "quasi-saturation region") to generate increased heating as a result of the higher forward conduction losses.

The modified gate-emitter voltage can be continuously applied to both of the series-connected IGBTs in each phase leg 18a, 18b and 18c so that they are maintained in the modified on-state without further switching. This means that current will flow continuously through the three parallel short circuit paths.

Preferably, the modified gate-emitter voltage can be continuously applied to only one of the series-connected IGBTs in each phase leg, while the other IGBT in each phase leg is switched by the gate driver between the modified on-state and the off-state. In other words, the gate driver for the switched IGBT can sequentially apply the modified gate-emitter voltage and a gate-emitter voltage that is below the gate-emitter threshold voltage ($V_{GE} < V_{GE(th)}$) so that the IGBT is repeatedly switched on and off. This "chopper" mode can allow the switched IGBT to control the heat dissipated in itself and in the other IGBT, which behaves like a resistor with a resistance between a certain range or preferably higher than a minimum resistance value. The current will flow intermittently through the three parallel short circuit paths. In the "chopper" mode, the switching of the IGBT can be controlled according to a suitable duty cycle or PWM strategy.

It is also possible for both of the IGBTs in each short circuit path to be switched by their respective gate drivers during the short circuit mode.

Although it will generally preferred that all of the IGBTs in each short circuit path are operated with modified on-state conduction to maximise heating, it will be understood that some of the IGBTs can also be operated with normal on-state conduction (i.e., their gate driver can apply the normal gate-emitter voltage) if this simplifies the control. If two or more short circuit paths are provided through the machine-side converter 2b during the period when the short circuit state is enabled, the IGBTs in each short circuit path (or in each phase leg) can be controlled in the same way, or differently.

Figure 5:
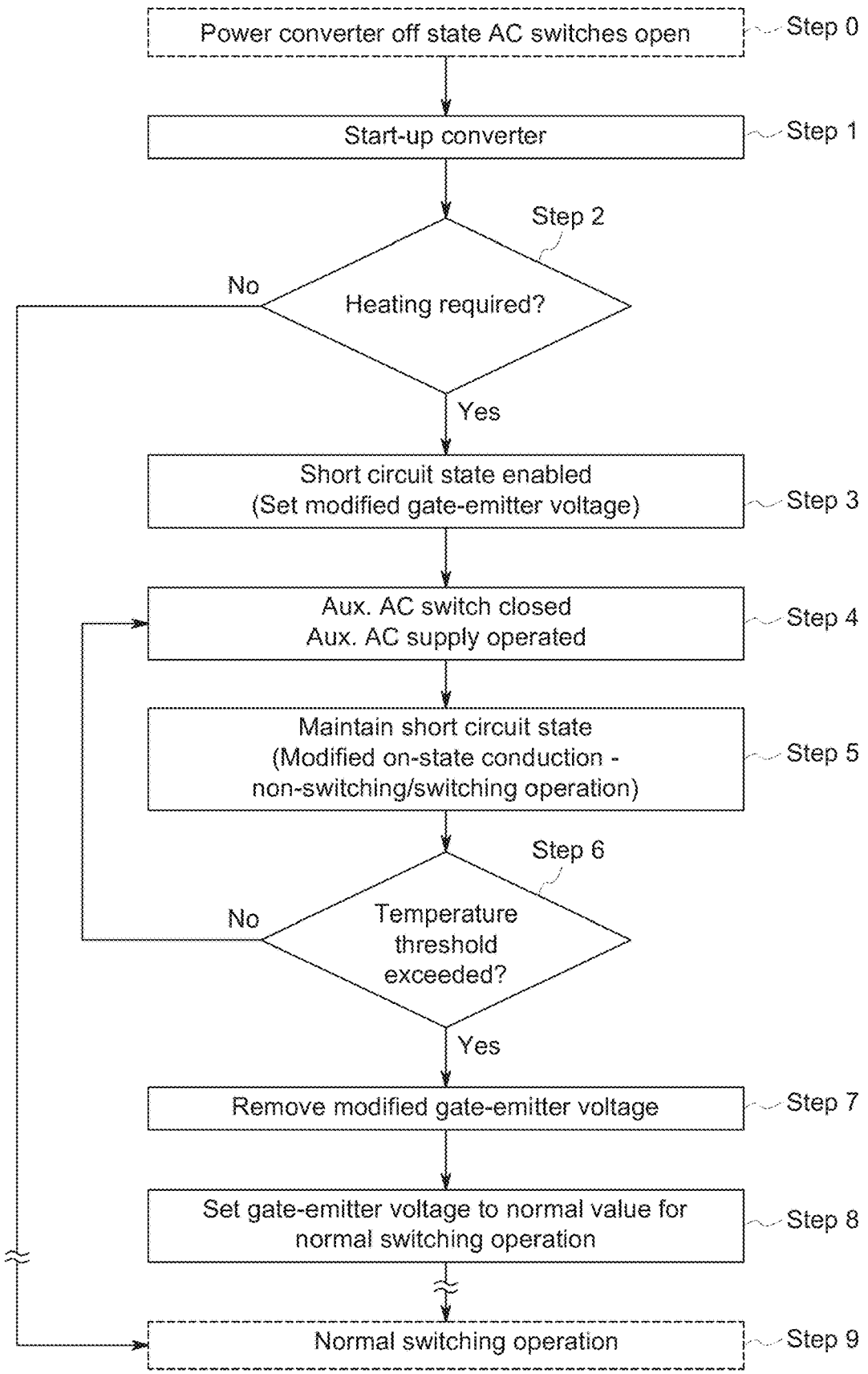
FIG. 5 is a flowchart of a method of starting a power converter system according to the present invention.

FIG. 5 is a flowchart of a method of starting the first power converter system 1A according to the present invention. It will be understood that the method is also applicable to the other power conversion systems described below, the only differences being (a) the AC power source and how it is operated to supply current on start-up, and (b) the converter unit of the power converter that is operated in the short circuit state. The method can be implemented by a controller of the first power converter system 1A.

The power converter 2 is initially in a converter off state (step 0), e.g., the power converter is enabled and all of the IGBTs are turned off. The main AC switch 12 is open and the auxiliary AC switch 28 is open.

In response to a start-up command, the power converter is started (step 1).

It is determined at step 2 if heating is required. The method may check to see if a temperature of one or more of the IGBTs, e.g., a junction temperature, or some other temperature associated the machine-side converter 2b, is below a first temperature threshold. The temperature may be measured, either directly or indirectly, estimated or otherwise determined in any suitable way as described herein. In one arrangement, the first temperature threshold for the junction temperature may be in the range of about 25° C. to about 125° C., or about 25° C. to about 100° C. if the temperature is a measured temperature of the IGBT (e.g., measured using an internal NTC-sensor). In another arrangement, the temperature may be the temperature inside the converter cabinet, the temperature inside an adjacent or neighbouring cabinet that is thermally coupled to the converter cabinet, or the temperature of a liquid cooling system for the power converter, for example. In this case, the first temperature threshold may be in the range of about 0° C. to about 25° C. (or more preferably about 5° C. to about 25° C.). It will be readily appreciated that other ranges for the first temperature threshold may be appropriate depending on the power converter system.

If the temperature is below the first temperature threshold, heating is required.

If no heating is required, the method proceeds immediately to step 9, which represents a normal switching operation for the power converter—see below.

If heating is required, the method proceeds to step 3 where the machine-side converter 2b is transitioned to a short circuit state. In particular, the IGBTs of the machine-side converter 2b are controlled by their respective gate drivers to create at least one short circuit path. For example, as shown in FIG. 4, all of the IGBTs in the three phase legs 18a, 18b and 18c are controlled for modified on-state conduction such that three parallel short circuit paths are provided through the machine-side converter 2b. A modified gate-emitter voltage is applied to all of the IGBTs in the three phase legs 18a, 18b and 18c.

As part of step 3, the modified gate-emitter voltage may be determined or selected with reference to one or more parameters of the power converter system or the associated IGBT as described in more detail below.

Once the machine-side converter 4b has been transitioned to the short circuit state, such that the IGBTs are turned on by their respective gate drivers to define the short circuit paths through the machine-side converter, the auxiliary AC switch 30 is closed and the auxiliary AC supply 24 is controlled to provide current to the DC link 22 through the grid-side converter 2a which is operating as a passive rectifier (step 4). It will be understood that the grid-side converter 2a can also have a switching operation where the IGBTs in the three phase legs 8a, 8b and 8c are switched to convert the AC current from the auxiliary AC supply 24 to a DC current. Such switching control may be carried out by a controller for the grid-side converter 2a and may additionally contribute to the overall heating as a result of switching losses.

The machine-side converter 2b is operated in the short circuit state (step 5) with the gate drivers for the IGBTs applying the modified gate-emitter voltage for modified on-state conduction. If one or more of the IGBTs are to be switched between the modified on-state and the off-state (e.g., for "chopper" operation), the gate drivers can apply the appropriate gate-emitter voltage to generate additional heating as a result of the switching losses. If at least one of the IGBTs in a short circuit path is switched, the current will only flow intermittently through the short circuit path while the short circuit mode is enabled. It will also be understood that one or more of the IGBTs may be operated with normal on-state conduction where the gate driver applies the normal gate-emitter voltage.

The principle heating is generated by operating the machine-side converter 2b in the short circuit state. Such heat is generated as a result of the forward conduction losses as the current flows through the IGBTs with modified on-state conduction. The IGBTs of the machine-side converter 2b are heated, together with any other components (including the anti-parallel connected diodes) that are thermally coupled with the IGBTs or with the machine-side converter as described herein, e.g., by means of an air or liquid cooling system.

At step 6, the method checks to see if a temperature of one or more of the IGBTs, e.g., a junction temperature, or some other temperature associated the machine-side converter 2b, exceeds a second temperature threshold. The temperature may be measured, either directly or indirectly, estimated or otherwise determined in any suitable way as described herein. In one arrangement, the second temperature threshold for the junction temperature may be in the range of about 25° C. to about 125° C., or about 25° C. to about 100° C. if the temperature is a measured temperature of the IGBT (e.g., measured using an internal NTC-sensor). In another arrangement, the temperature may be the temperature inside the converter cabinet, the temperature inside an adjacent or neighbouring cabinet that is thermally coupled to the converter cabinet, or the temperature of a liquid cooling system for the power converter, for example. In this case, the second temperature threshold may be in the range of about 0° C. to about 25° C. (or more preferably about 5° C. to about 25° C.). It will be readily appreciated that other ranges for the second temperature threshold may be appropriate depending on the power converter system.

If the second temperature threshold is not exceeded, the machine-side inverter 2b is maintained in the short circuit state—the method returns to step 4. If the second temperature threshold is exceeded, the method proceeds to step 7.

In an alternative arrangement, the short circuit state can be enabled for a predetermined period of time, after which the method would proceed to step 7.

At step 7, the modified gate-emitter voltage is removed from the IGBTs by the gate drivers. The IGBTs of the machine-side converter 2b are therefore switched to the off-state.

The gate-emitter voltage for each gate driver can be set to the normal value (i.e., the gate-emitter voltage used for normal switching operation of the machine-side converter 2b)—step 8.

Step 9 represents normal switching operation for the power converter 2. It will be understood that there will be one or more intermediate step between steps 8 and 9 and between steps 2 and 9, but they do not form part of the present invention. For example, a pre-charge step might be included to pre-charge the DC link 22 of the power converter using the auxiliary AC supply 30 before normal switching operation is started. At some point, the auxiliary AC supply 30 will be controlled to stop supplying current to the grid-side converter and the auxiliary AC switch 28 will be opened. For normal switching operation, the main AC switch 12 will also be closed so that the power converter 2 is connected to the AC power network or utility grid 6. Before step 9, the power converter 2 may be transitioned to the off state or a zero state where all of the IGBTs are controlled to be in a suitable switching state (i.e., either an on-state or an off-state) such that each phase of the converter unit is connected to the same DC voltage level and the instantaneous AC output voltage is zero.

Figure 6:
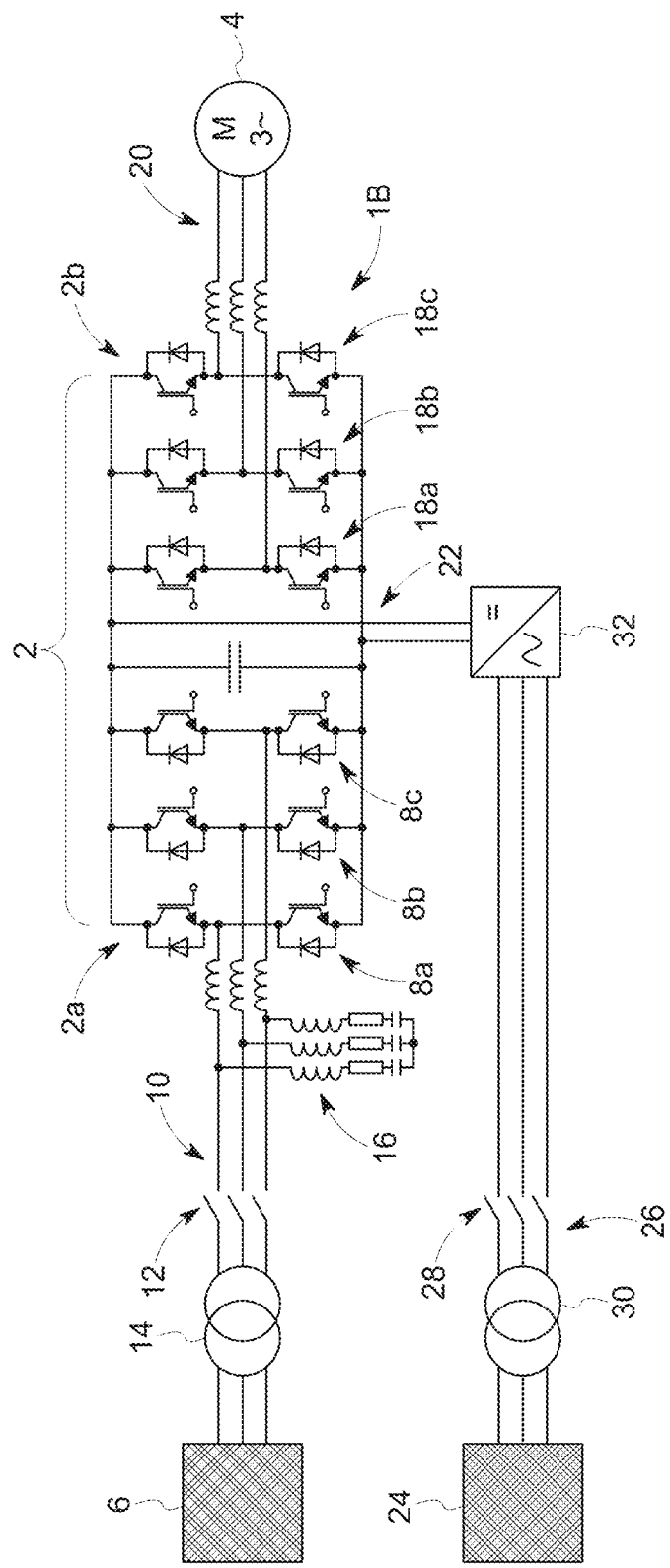
FIG. 6 is a schematic diagram of a second power converter system according to the present invention.
Figure 7:
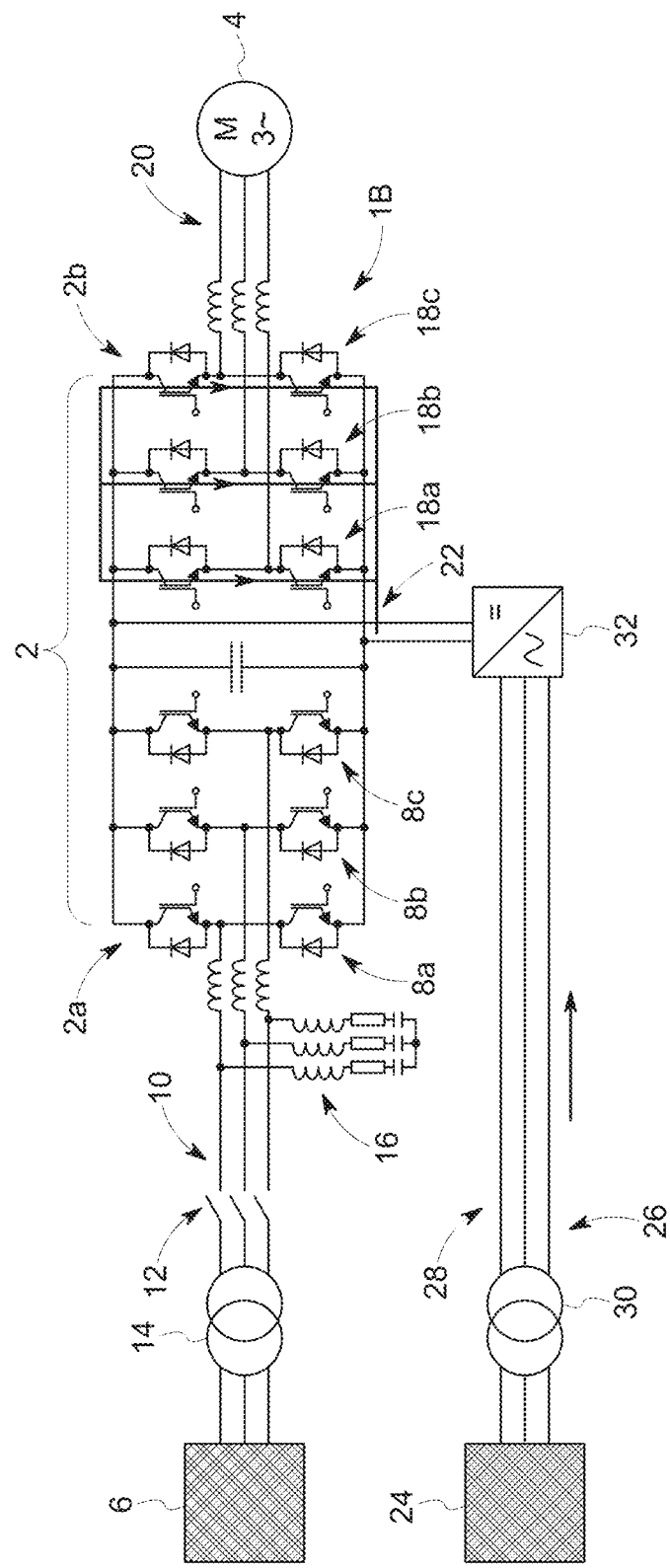
FIG. 7 is a schematic diagram of the second power converter system of FIG. 6 with the short circuit state enabled.

A second power converter system 1B is shown in FIG. 6. The second power converter system 1B is similar to the first power converter system 1A described above and like components have been given the same reference sign. In this arrangement, the auxiliary AC supply 24 is connected to the DC link 22 and the auxiliary AC circuit includes a rectifier 32. With reference to FIG. 7, on start-up of the power converter 2, the main AC switch 12 is open so that the power converter 2 is disconnected from the AC power network or utility grid 6. The auxiliary AC switch 28 is closed and a controller (not shown) is used to control the auxiliary AC supply 24 to supply current to the DC link 22. The machine-side converter 2b is transitioned to a short circuit state by controlling the IGBTs to create at least one short circuit path.

Figure 8:
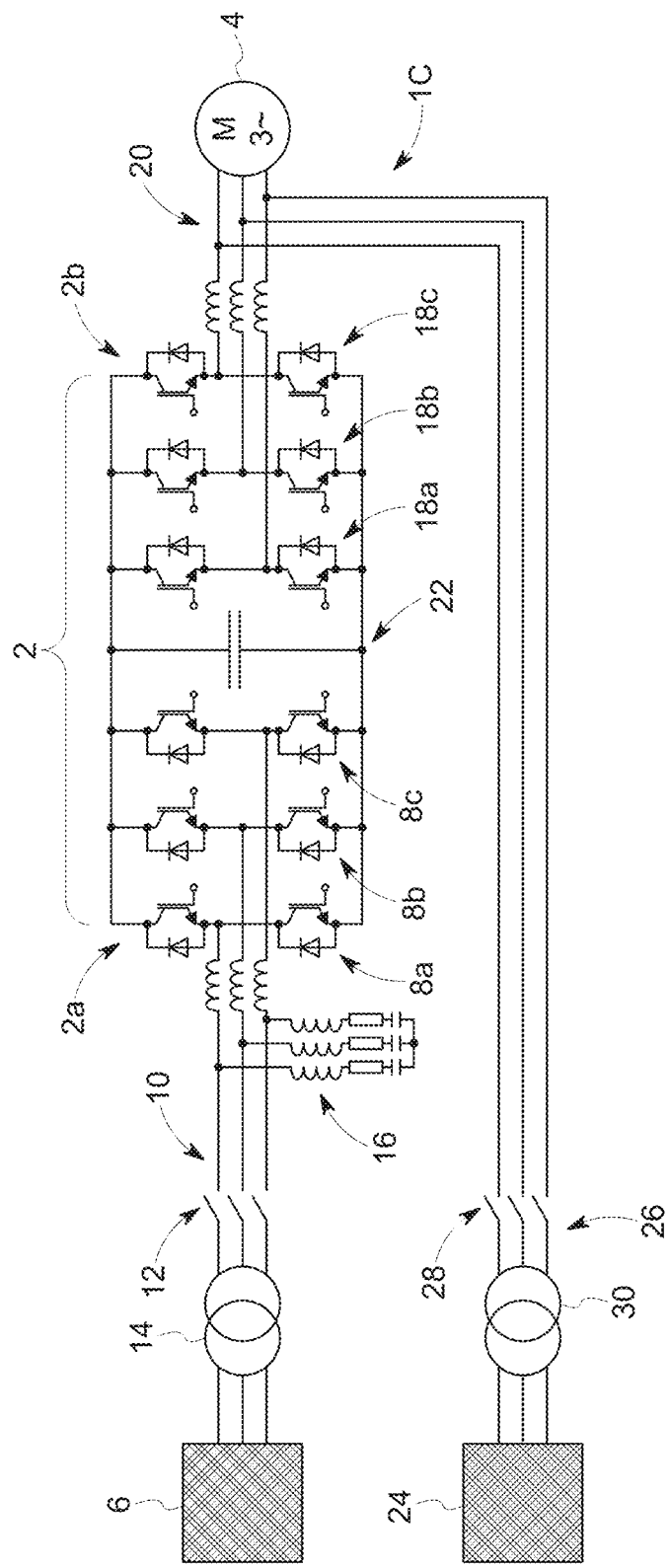
FIG. 8 is a schematic diagram of a third power converter system according to the present invention.
Figure 9:
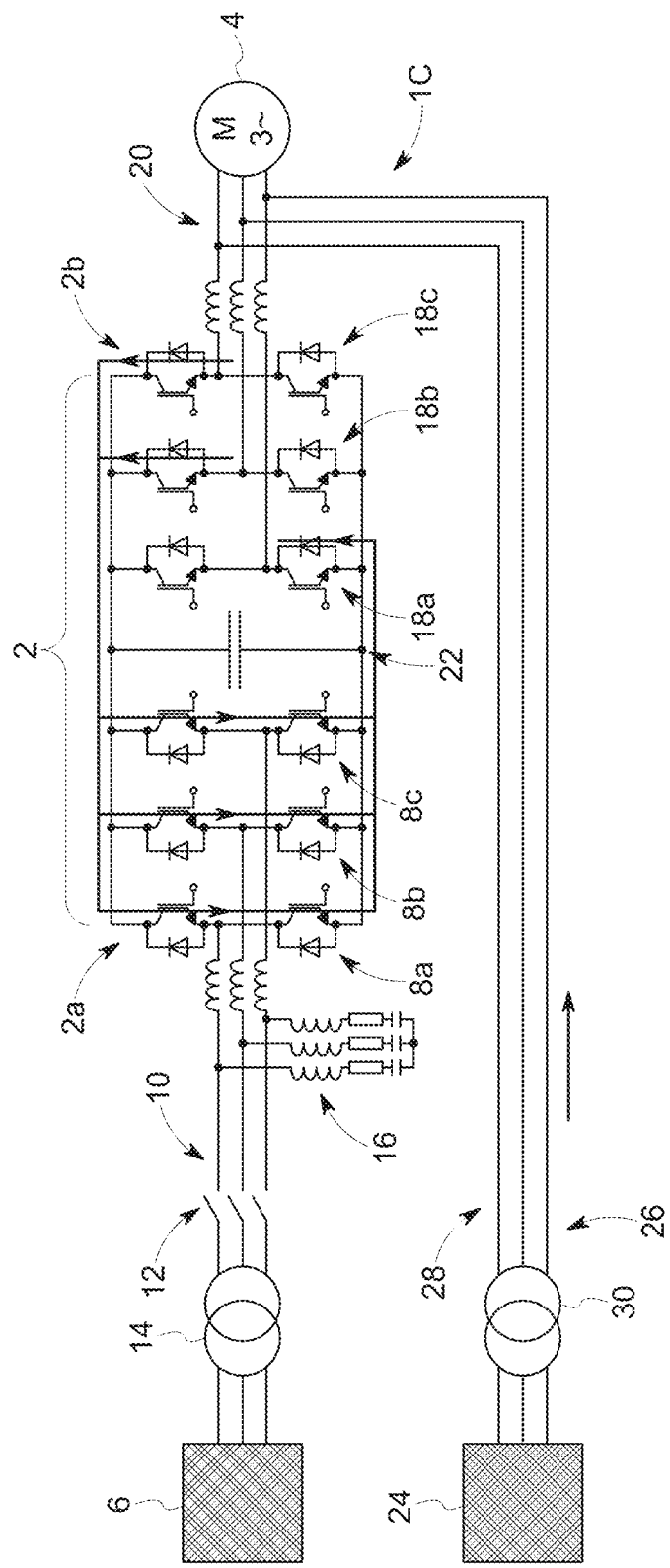
FIG. 9 is a schematic diagram of the third power converter system of FIG. 8 with the short circuit state enabled.

A third power converter system 1C is shown in FIG. 8. The third power converter system 1C is similar to the first and second power converter systems 1A and 1B described above and like components have been given the same reference sign. In this arrangement, the auxiliary AC supply is connected to the AC circuit 20 that connects the electric machine 4 to the machine-side converter 2b. With reference to FIG. 9, on start-up of the power converter 2, the main AC switch 12 is open so that the power converter 2 is disconnected from the AC power network or utility grid 6. The auxiliary AC switch 28 is closed and a controller (not shown) is used to control the auxiliary AC supply 24 to supply current to the AC terminals of the machine-side converter 2b.

The machine-side converter 2b operates as a rectifier—in this case as a passive rectifier, for example—to convert the AC current from the auxiliary AC supply to DC current which is then supplied to the DC terminals of the grid-side converter 2a through the DC link 22. The grid-side converter 2a is transitioned to a short circuit state by controlling the IGBTs to create at least one short circuit path. In FIG. 9, all of the IGBTs in the three phase legs 8a, 8b and 8c are controlled for modified on-state conduction such that three parallel short circuit paths are provided through the grid-side converter 2a. The modified on-state conduction is controlled by the gate drivers (not shown) applying a modified gate-emitter voltage as described above.

Figure 10:
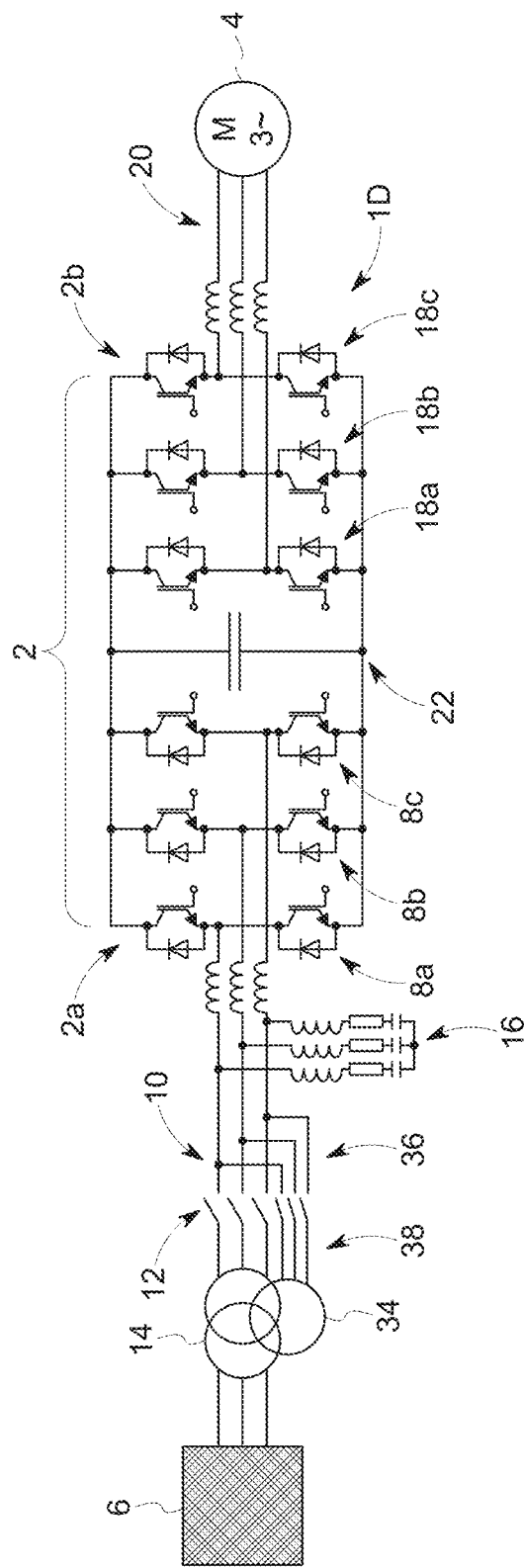
FIG. 10 is a schematic diagram of a fourth power converter system according to the present invention.

A fourth power converter system 1D is shown in FIG. 10. The fourth power converter system 1D is similar to the first, second and third power converter systems described above and like components have been given the same reference sign. In this arrangement, the auxiliary AC supply is replaced by an auxiliary transformer winding. In particular, the main transformer 14 includes an auxiliary winding 34 that is connected to the main AC circuit 10 (and in particular, to a junction between the main AC switch 12 and the line filters 16) by a three-phase auxiliary AC circuit 36. The auxiliary AC circuit 36 includes an auxiliary AC switch 38.

Figure 11:
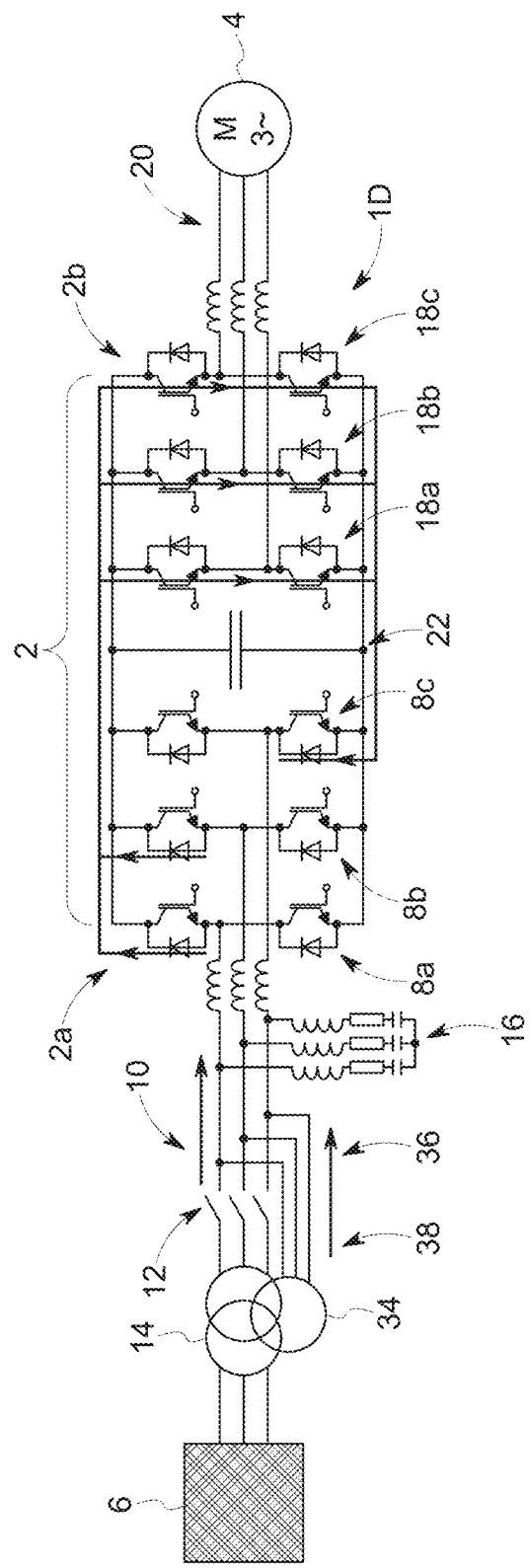
FIG. 11 is a schematic diagram of the fourth power converter system of FIG. 10 with the short circuit state enabled.

With reference to FIG. 11, on start-up of the power converter 2, the main AC switch 12 is open. The auxiliary AC switch 38 is closed and current is supplied to the AC terminals of the grid-side converter 2a.

The grid-side converter 2a operates as a rectifier—in this case as a passive rectifier, for example—to convert the AC current from the auxiliary winding to DC current which is then supplied to the DC terminals of the machine-side converter 2b through the DC link 22. If the grid-side converter 2a is operated as a passive rectifier, the DC link voltage is controlled by the auxiliary AC supply. Additional control of the DC link voltage can be achieved if the grid-side converter 2a is operated as an active rectifier by controlling the switching of the IGBTs.

The machine-side converter 2b is transitioned to a short circuit state by controlling the IGBTs to create at least one short circuit path. In FIG. 11, all of the IGBTs in the three phase legs 18a, 18b and 18c are controlled for modified on-state conduction such that three parallel short circuit paths are provided through the machine-side converter 2b. The modified on-state conduction is controlled by the gate drivers (not shown) applying a modified gate-emitter voltage as described above.

Although not shown, it will be understood that that the auxiliary winding 32 can also be connected directly to the DC link 22 or to the AC circuit 20 in a similar way to the auxiliary AC supply shown in FIGS. 6 and 8.

Figure 12:
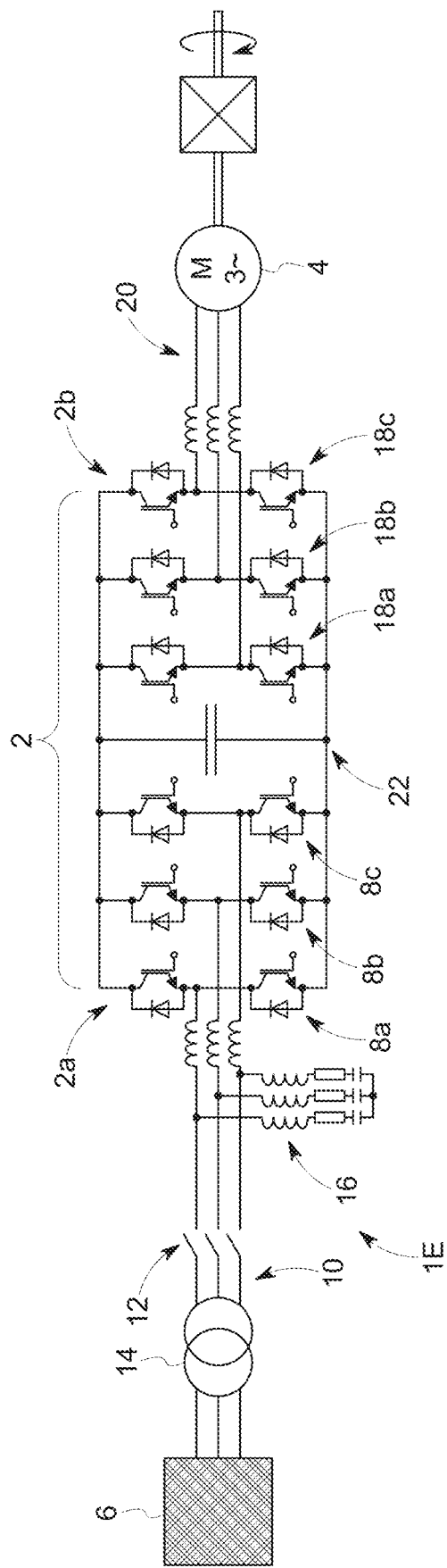
FIG. 12 is a schematic diagram of a fifth power converter system according to the present invention.

A fifth power converter system 1E is shown in FIG. 12. The fifth power converter system 1E is similar to the first, second, third and fourth power converter systems 1A, 1B, . . . , 1D described above and like components have been given the same reference sign. In this arrangement, the electric machine 4 can be operated as a generator and the rotor is connected to a turbine assembly or prime mover, for example.

During normal operation, the main AC switch 12 is closed and the power converter 2 can be used to supply power from the electric machine 4 to the AC power network or utility grid 6. The machine-side converter 2b will operate as an active rectifier by controlling the IGBTs with a normal switching operation to convert an AC input voltage from the electric machine 4 to a DC output voltage. The grid-side converter 2a will operate as an inverter by controlling the IGBTs to convert a DC input voltage (i.e., from the machine-side converter 2b) to an AC output voltage that meets the required voltage, frequency and current requirements of the AC power network or utility grid.

Figure 13:
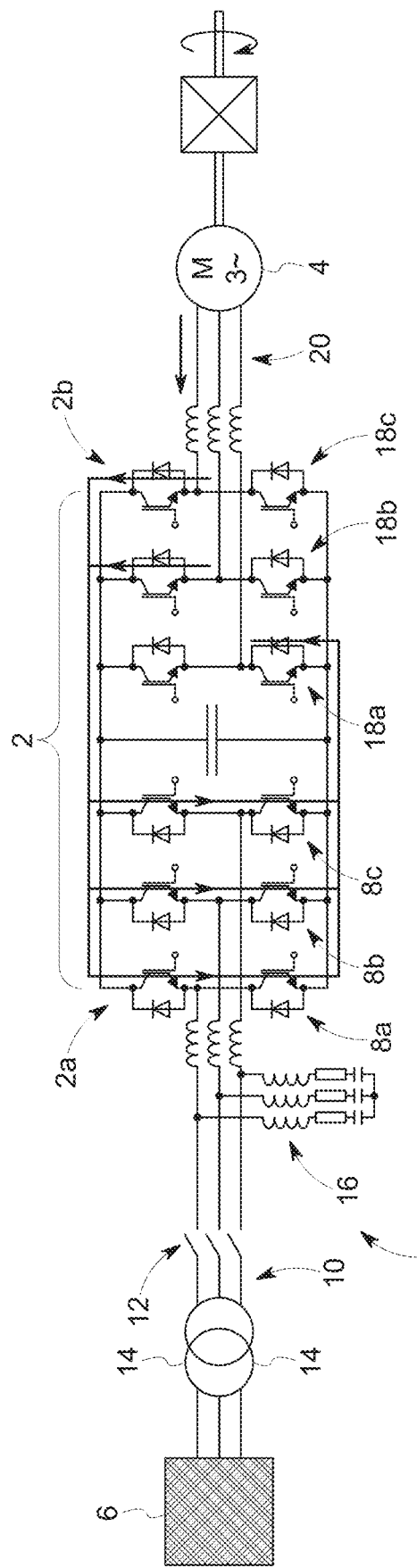
FIG. 13 is a schematic diagram of the fifth power converter system of FIG. 12 with the short circuit state enabled.

With reference to FIG. 13, on start-up of the power converter 2, the main AC switch 12 is open so that the power converter 2 is disconnected from the AC power network or utility grid 6. The electric machine 4 (or the turbine assembly or prime mover) is controlled to supply current to the AC terminals of the machine-side converter 2b.

The machine-side converter 2b operates as a rectifier—in this case as a passive rectifier, for example—to convert the AC current from the electric machine 4 to DC current which is then supplied to the DC terminals of the grid-side converter 2a through the DC link 22. If the machine-side converter 2b is operated as a passive rectifier, the DC link voltage is controlled by the output of the electric machine 4. Additional control of the DC link voltage can be achieved if the machine-side converter 2b is operated as an active rectifier by controlling the switching of the IGBTs.

The grid-side converter 2a is transitioned to a short circuit state by controlling the IGBTs to create at least one short circuit path. In FIG. 13, all of the IGBTs in the three phase legs 8a, 8b and 8c are controlled for modified on-state conduction such that three parallel short circuit paths are provided through the grid-side converter 2a. The modified on-state conduction is controlled by the gate drivers (not shown) applying a modified gate-emitter voltage as described above.

Figure 14:
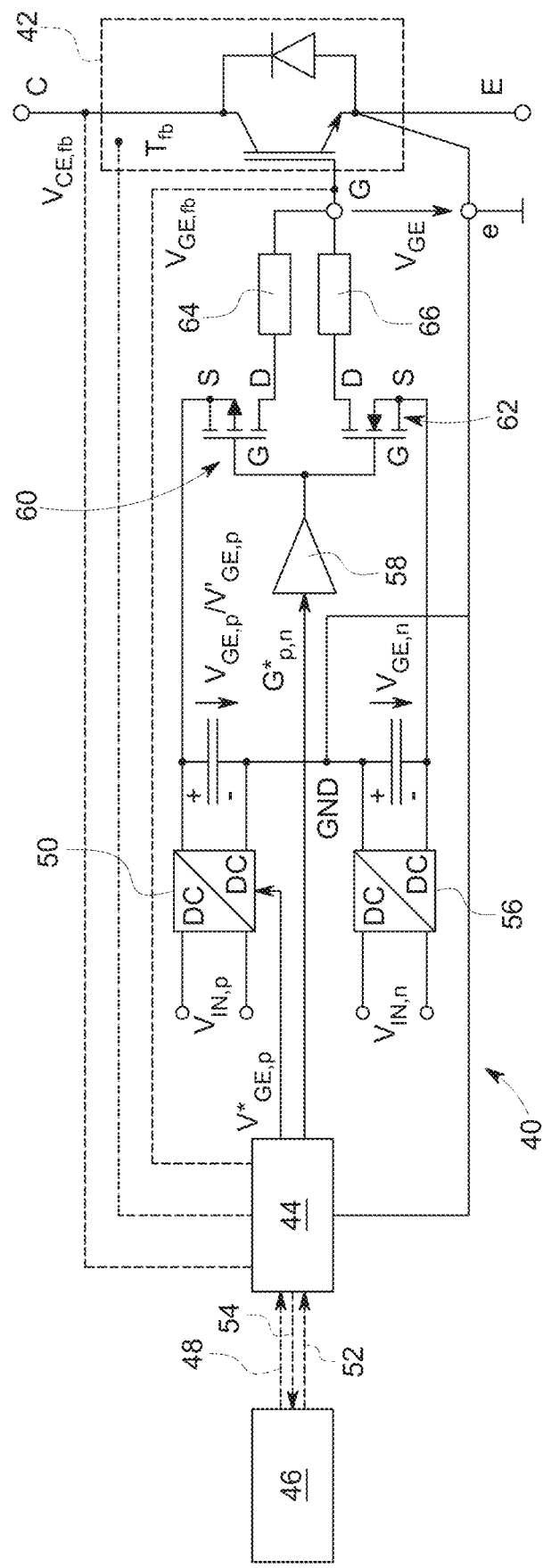
FIG. 14 is a schematic diagram of a gate drive circuit.

FIG. 14 shows an example of a gate driver 40 that can be used to implement the present invention. The gate driver 40 is shown connected to the gate terminal (labelled "G") and the emitter terminal (labelled "E") of an IGBT 42. The IGBT 42 also includes a collector terminal (labelled "C"). It will be readily appreciated that a similar gate driver can also be used to control the switching of MOSFETs, including power MOSFETs that are specifically designed for high power applications.

The gate driver 40 includes a gate driver controller 44, which can be implemented as a programmable logic or microprocessor, for example. The gate driver controller 44 can exchange signals with a system (or converter) controller 46 as shown. The system (or converter) controller 46 generates firing signals 48 for the IGBT 42 (i.e., determines when the IGBT should be turned on and off) and these firing signals are sent to the gate drive controller 44 which applies the appropriate gate-emitter voltage to turn the IGBT 42 on or off. The gate driver 40 includes a first switch mode DC/DC converter 50 that receives a DC input voltage $V_{IN,p}$ and which provides a positive gate-emitter voltage $V_{GE,p}$ (or $V'_{GE,p}$ for modified on-state conduction). The positive gate-emitter voltage (i.e., $V_{GE,p}$ or $V'_{GE,p}$) is selected by the gate drive controller 44 using a reference signal $V*_{GE,p}$ that is provided to the DC/DC converter 50. The DC/DC converter 50 can alter its duty cycle on the basis of the reference signal $V*_{GE,p}$ in order to the provide the appropriate positive gate-emitter voltage for either normal or modified on-state conduction. The reference signal $V*_{GE,p}$ for modified on-state conduction of the IGBT 42 may be a fixed value if open-loop control is used. Or for closed-loop control, the reference signal $V*_{GE,p}$ for modified on-state conduction of the IGBT 42 may be determined by the gate driver controller 44 with reference to one or more measured signals including a measured collector-emitter voltage $V_{CE,fb}$, a measured gate-emitter voltage $V_{GE,fb}$ and a measured temperature $T_{fb}$ of the IGBT as shown. The positive gate-emitter voltage provided by the DC/DC converter 50 may be varied according to the reference signal. The gate driver controller 44 can receive command signals 52 from the system (or converter) controller 46 when the gate-emitter voltage for modified on-state conduction should be applied to the IGBT 42 (e.g., when the short circuit state is enabled for heating) and when the gate-emitter voltage for normal on-state conduction should be applied to the IGBT (e.g., during normal switching operation). The gate drive controller 44 can send an appropriate signal 54 to the system (or converter) controller 46 to confirm that the gate-emitter voltage for modified on-state conduction will be applied to the IGBT 42. All signals can be sent along a single cable or line that connects the gate driver controller 44 to the system (or converter) controller 46.

The gate driver 40 includes a second switch mode DC/DC converter 56 that receives a DC input voltage $V_{IN,n}$ and which provides a negative gate-emitter voltage $V_{GE,n}$.

In a similar manner to a conventional gate driver, the gate driver controller 44 generates a gate signal $G^*_{p,n}$ which is supplied to an amplifier stage 58. The amplifier stage 58 controls switches (e.g., MOSFETs 60, 62) to turn on and off in order to apply either the positive or the negative gate-emitter voltage to the gate terminal of the IGBT 42 through a respective on- or off-state resistance 64, 66. In other words, when the IGBT 42 is commanded to be in the on-state by the firing signals 48, the gate signal $G^*_{p,n}$ controls the amplifier so that MOSFET 60 is turned on and MOSFET 62 is turned off such that the positive gate-emitter voltage (i.e., $V_{GE,p}$ or $V'_{GE,p}$ depending on whether normal or modified on-state conduction is selected) is applied to the gate terminal of the IGBT 42 through the on-state resistance 64. When the IGBT 42 is commanded to be in the off-state by the firing signals 48, the gate signal G*p,n controls the amplifier so that the MOSFET 60 is turned off and MOSFET 62 is turned on such that the negative gate-emitter voltage (i.e., $V_{GE,n}$) is applied to the gate terminal of the IGBT 42 through the off-state resistance 66.

During normal switching operation, the IGBT 42 can be switched on and off by controlling the gate driver 40 to sequentially apply the normal positive gate-emitter voltage $V_{GE,p}$ and the negative gate-emitter voltage $V_{GE,n}$. During the short circuit state, the IGBT 42 in a short circuit path can be switched on and maintained in the modified on-state by controlling the gate driver 40 to apply the modified positive gate-emitter voltage $V'_{GE,p}$ or can be switched repeatedly on and off by controlling the gate driver to sequentially apply the modified positive gate-emitter voltage $V'_{GE,p}$ and the negative gate-emitter voltage, for example for "chopper" operation.

Although not shown, control of the positive gate-emitter voltage could also be implemented through a current source that charges the gate to a specific voltage level.

It is generally possible to dissipate about 2 kW or more per semiconductor switch within a module package for a power converter in the >1 MW range with normal on-state conduction.

A pre-charge circuit for a similar power converter can provide about 5 to 10 kVA which can be used for the heating on start-up. Using the present invention, with modified on-state conduction, it is possible to dissipate about 4 to 10 kW through multiple semiconductor switches in different module packages within the power converter.

The invention claimed is:

1. A method of controlling a power converter system, the power converter system comprising:
    a power converter comprising a first converter including a plurality of semiconductor devices, each semiconductor device including at least a controllable semiconductor switch having a threshold voltage and a gate voltage for normal on-state conduction, the first converter having first and second direct current DC terminals connected to a DC circuit, and a plurality of alternating current AC terminals;
    the method comprising:
    supplying current to the first converter,
    enabling a short circuit state of the first converter by controlling semiconductor switches of the first converter to create at least one short circuit path through the first converter that carries the supplied current;
    wherein the at least one short circuit path includes two or more semiconductor switches connected in series, wherein during the short circuit state, one of the series-connected semiconductor switches is maintained in the modified on-state or the normal on-state and another one of the series-connected semiconductor switches is switched between the modified on-state and the off-state or the normal on-state and the off-state, and
    applying to the one of the series-connected semiconductor switches a modified gate voltage that is less than the gate voltage for normal on-state conduction and the modified gate voltage equals to the threshold voltage plus x volts, where x is in the range of 100 mV to 4 V.

2. The method according to claim 1, further comprising the maintaining the short circuit state of the first converter for a certain period of time, or at least until a temperature that is associated with the power converter exceeds a temperature threshold.

3. The method according to claim 2, wherein the temperature threshold is in the range of 0° C. to 25° C.

4. The method according to claim 1, wherein the step of supplying current to the first converter comprises supplying current to the DC terminals of the first converter.

5. The method according to claim 4, wherein the power converter further comprises a second converter including a plurality of semiconductor devices, the second converter having first and second direct current DC terminals connected to the DC circuit, and a plurality of alternating current AC terminals, and
    wherein the step of supplying current to the DC terminals of the first converter comprises supplying current to the AC terminals of the second converter and operating the second converter as a rectifier.

6. A power converter system comprising:
    a power converter comprising a first converter including a plurality of semiconductor devices, each semiconductor device including at least a controllable semiconductor switch having a threshold voltage and a gate voltage for normal on-state conduction, the first converter having first and second DC terminals connected to a DC circuit, and a plurality of AC terminals;
    a controller configured to supply current to the first converter and enabling a short circuit state of the first converter by controlling semiconductor switches of the first converter to create at least one short circuit path through the first converter that carries the supplied current; and
    two or more semiconductor switches connected in series in the at least one short circuit path and during the short circuit state, one of the series-connected semiconductor switches is maintained in the modified on-state or the normal on-state and another one of the series-connected semiconductor switches is switched between the modified on-state and the off-state or the normal on-state and the off-state,
    wherein the modified on-state comprises applying to the one of the series-connected semiconductor switches a modified gate voltage that is less than the gate voltage for normal on-state conduction and the modified gate voltage equals to the threshold voltage plus x volts, where x is in the range of 100 mV to 4 V.

7. The power converter system according to claim 6, wherein the controller is configured to maintain the short circuit state of the first converter for a period of time, or at least until a temperature that is associated with the power converter exceeds a temperature threshold.

8. The power converter system according to claim 6, wherein the DC circuit is a DC link that includes one or more capacitors.

9. The power converter system according to claim 6, wherein the semiconductor switches are insulated gate bipolar transistors IGBTs or metal oxide semiconductor field-effect transistors MOSFETs.

10. The power converter system according to claim 6, further comprising a second converter including a plurality of semiconductor devices, the second converter having first and second direct current DC terminals connected to the DC circuit, and a plurality of alternating current AC terminals.

11. The power converter system according to claim 10, further comprising an AC power source connected to the AC terminals of the second power converter.

12. The power converter system according to claim 6, further comprising an AC power source connected to the DC circuit by a rectifier.

* * * * *